United States Patent
Kojima

(10) Patent No.: US 9,995,994 B2
(45) Date of Patent: Jun. 12, 2018

(54) IMAGE PICKUP APPARATUS

(71) Applicant: CANON KABUSHIKI KAISHA, Tokyo (JP)

(72) Inventor: Nobuhisa Kojima, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days. days.

(21) Appl. No.: 15/427,395

(22) Filed: Feb. 8, 2017

(65) Prior Publication Data

US 2017/0235215 A1  Aug. 17, 2017

(30) Foreign Application Priority Data

Feb. 12, 2016  (JP) .................................. 2016-024475

(51) Int. Cl.
   *G03B 19/12*  (2006.01)
(52) U.S. Cl.
   CPC ........ *G03B 19/12* (2013.01); *G03B 2217/002* (2013.01)
(58) Field of Classification Search
   CPC ...................................................... G03B 19/12
   USPC ....................................................... 396/358
   See application file for complete search history.

(56) References Cited

U.S. PATENT DOCUMENTS

| 2010/0097021 A1* | 4/2010 | Kiyamura | ................. H02P 6/16 318/400.14 |
| 2014/0265992 A1* | 9/2014 | Mizuo | ..................... H02P 8/36 318/696 |
| 2014/0368941 A1* | 12/2014 | Sato | ..................... G02B 7/1821 359/877 |

FOREIGN PATENT DOCUMENTS

JP  2014-219582 A  11/2014

OTHER PUBLICATIONS

Translation of 2014-219582.*

* cited by examiner

*Primary Examiner* — Clayton E Laballe
*Assistant Examiner* — Leon W Rhodes, Jr.
(74) *Attorney, Agent, or Firm* — Cowan, Liebowitz & Latman, P.C.

(57) ABSTRACT

An image pickup apparatus includes a main mirror holder rotating between a mirror down position in an image pickup optical path and a mirror up position outside the image pickup optical path in accordance with drive of a mirror driving unit, which drives in accordance with rotation of a motor, a sub mirror holder being supported by the main mirror holder to abut against the main mirror holder positioned at the mirror up position, and a driving pin rotating in accordance with the drive of the mirror driving unit and rotating the main and sub mirror holders. The driving pin includes an abutting part that abuts against the mirror driving unit while the mirror driving unit drives. The abutting part is provided with a reduction structure to reduce a bound of the sub mirror holder when the main mirror holder reaches the mirror up position.

9 Claims, 18 Drawing Sheets

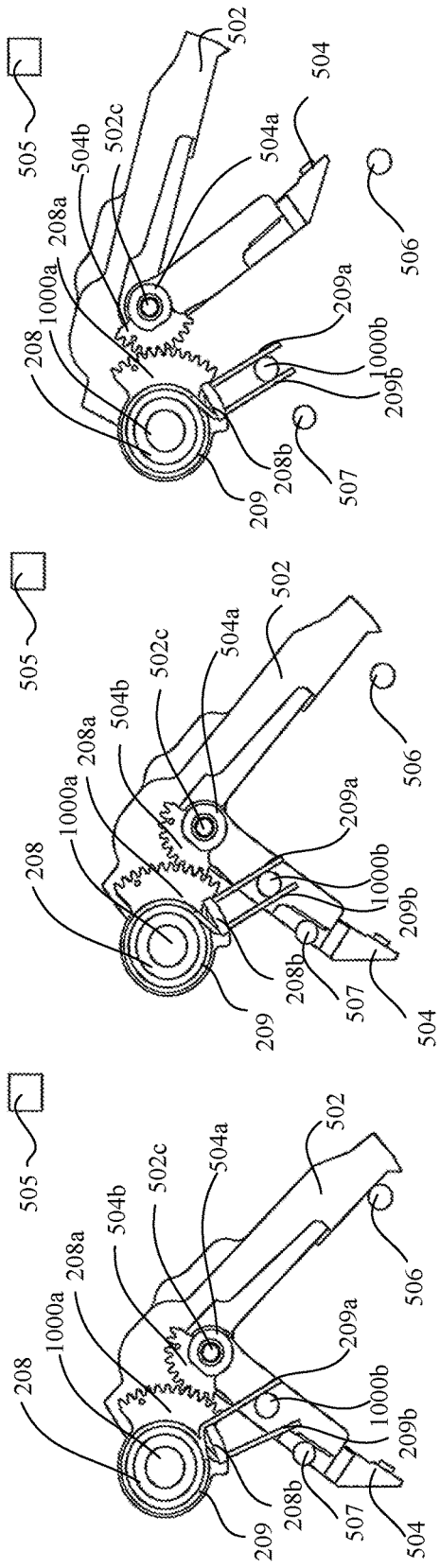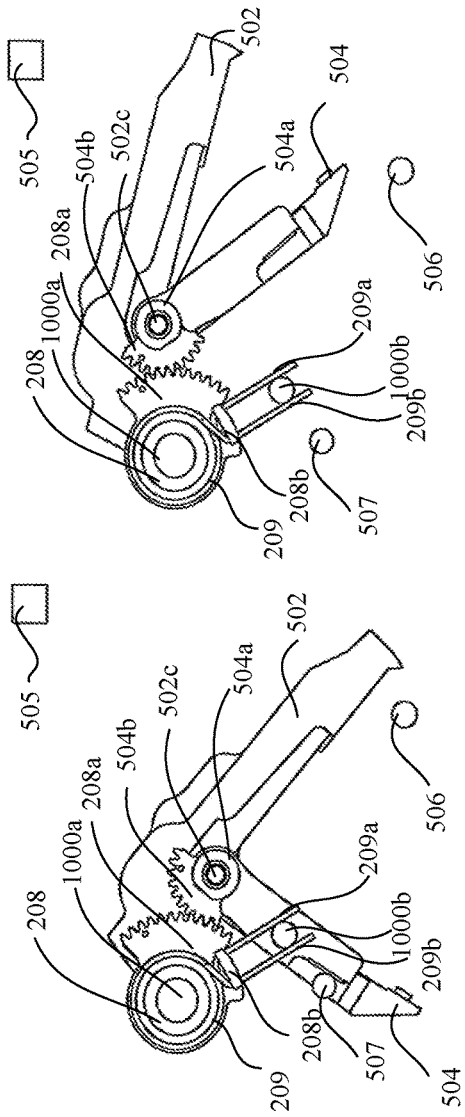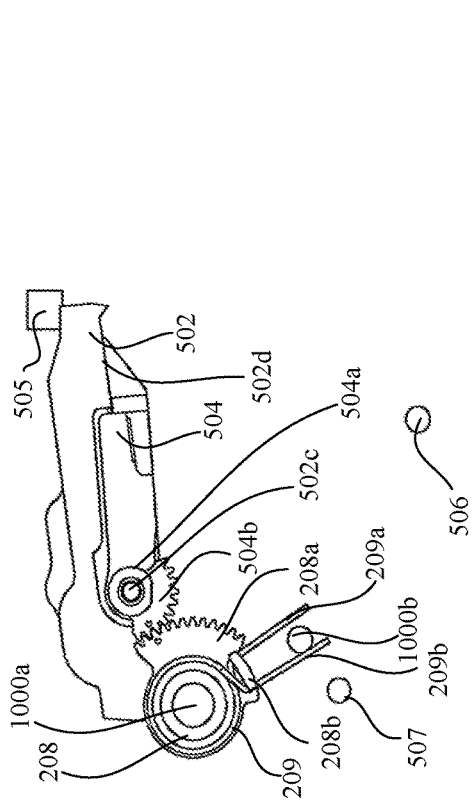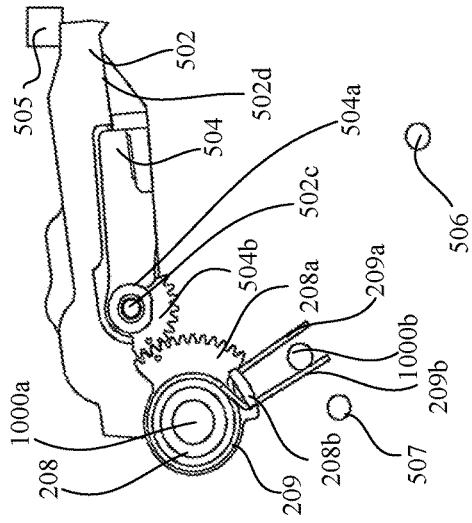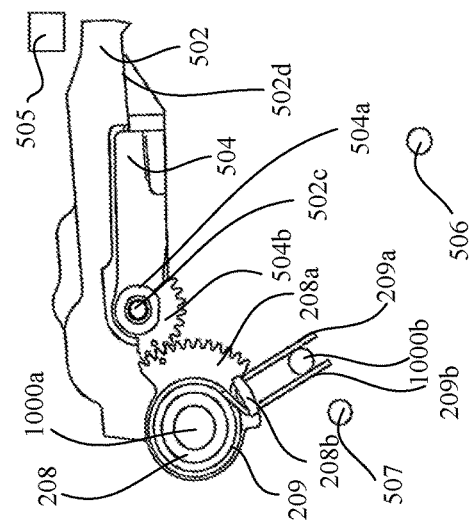

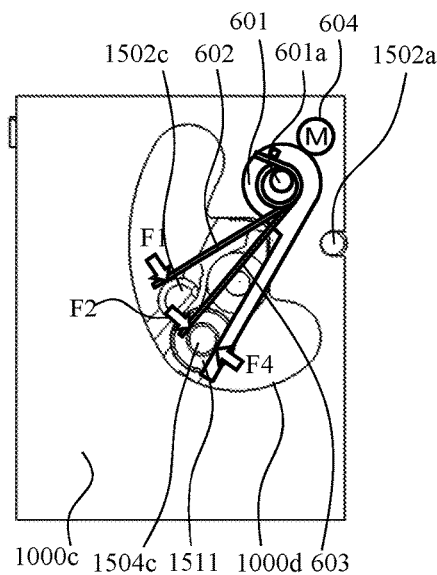
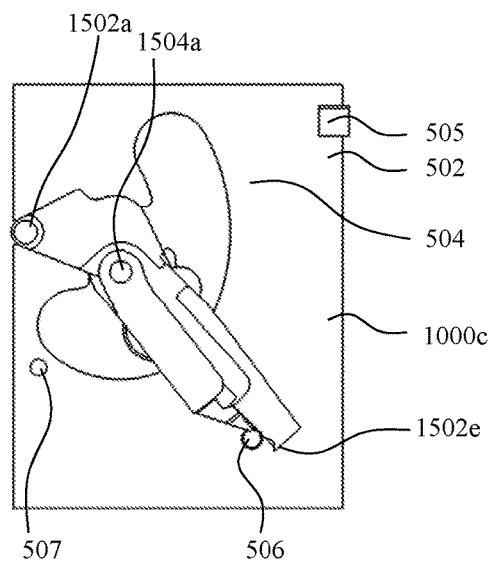
FIG. 16A          FIG. 16B
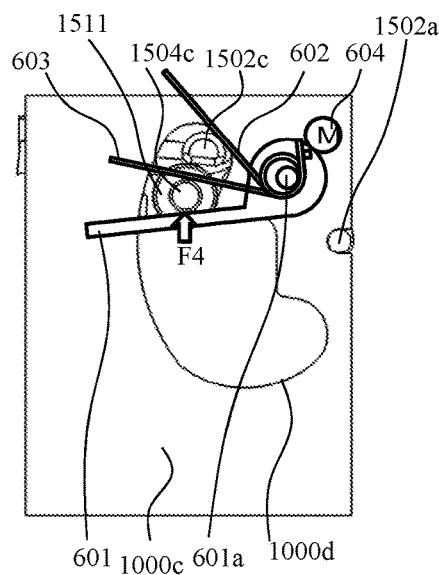
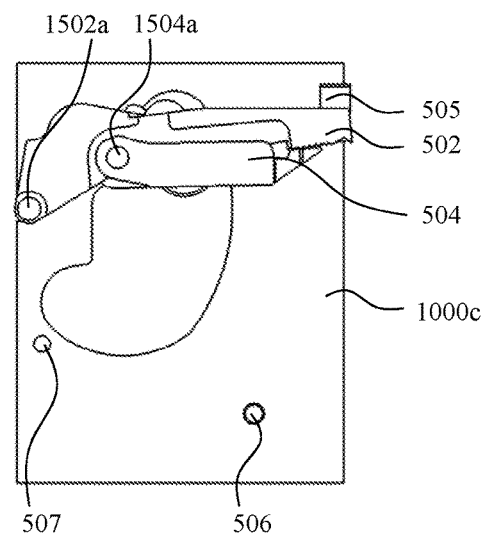
FIG. 17A          FIG. 17B

IMAGE PICKUP APPARATUS

BACKGROUND OF THE INVENTION

Field of the Invention

The present invention relates to an image pickup apparatus.

Description of the Related Art

A single-lens reflex camera conventionally includes a quick return mirror mechanism using a direct drive method to drive a main mirror directly. Japanese Patent Laid-Open No. 2014-219582 discloses a mirror driving apparatus where a buffer member is arranged on a side surface part of a sun gear to reduce a bound generated by rotation of a main mirror and a sub mirror.

However, the conventional art disclosed in Japanese Patent Laid-Open No. 2014-219582 requires the buffer member and a space to arrange the buffer member.

SUMMARY OF THE INVENTION

In view of the problem, an object of the present invention is to provide an image pickup apparatus capable of reducing a bound of a sub mirror using a simple and inexpensive configuration.

An image pickup apparatus according to one aspect of the present invention includes a motor, a mirror driving unit that drives in accordance with rotation of the motor, a main mirror holder that rotates between a mirror down position in an image pickup optical path and a mirror up position outside the image pickup optical path in accordance with drive of the mirror driving unit, a sub mirror holder that is rotatably supported by the main mirror holder and that abuts against the main mirror holder positioned at the mirror up position, and a driving pin that rotates in accordance with the drive of the mirror driving unit and that rotates the main mirror holder and the sub mirror holder. The driving pin includes an abutting part that abuts against the mirror driving unit while the mirror driving unit drives. The abutting part is provided with a reduction structure to reduce a bound of the sub mirror holder when the main mirror holder reaches the mirror up position.

Further features of the present invention will become apparent from the following description of exemplary embodiments with reference to the attached drawings.

BRIEF DESCRIPTION OF THE DRAWINGS

FIGS. 8A to 8E are explanatory views of an operation of a mirror unit and a sun gear (first example).

FIGS. 16A and 16B are schematic diagrams illustrating the mirror unit being in a second state (third example).

FIGS. 17A and 17B are schematic diagrams illustrating the mirror unit being in a third state (third example).

DESCRIPTION OF THE PREFERRED EMBODIMENTS

Figure 1:
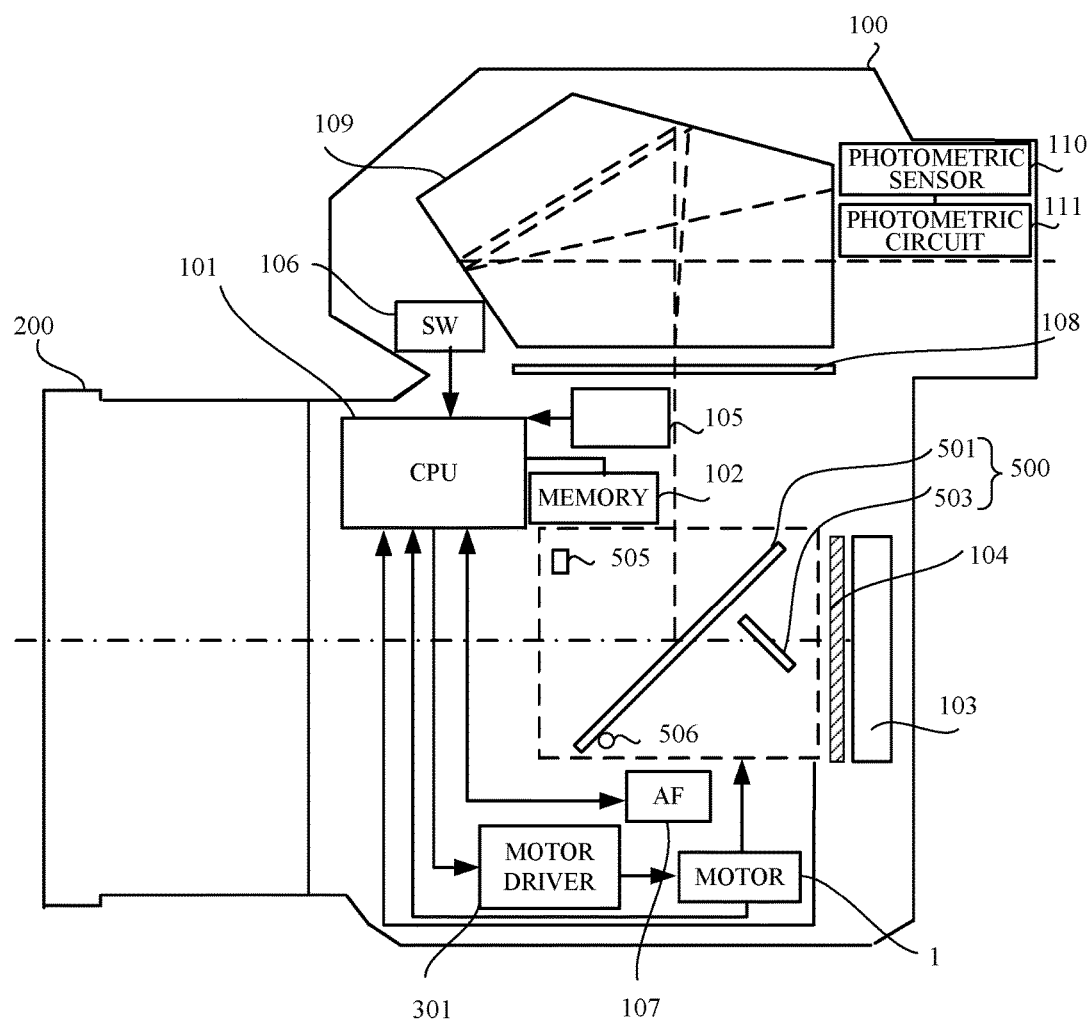
FIG. 1 is a block diagram of an image pickup apparatus according to an embodiment of the present invention.

Exemplary embodiments of the present invention will be described below with reference to the accompanied drawings. In each of the drawings, the same elements will be denoted by the same reference numerals and the duplicate descriptions thereof will be omitted.

FIG. 1 is a block diagram of an image pickup apparatus according to an embodiment of the present invention. The image pickup apparatus includes a main body 100 and a lens (image pickup optical system) 200 detachably attached to the main body 100. A CPU (controlling unit) 101 controls each part of the main body 100. A memory (memory unit) 102 is a memory such as a random access memory (RAM) and read only memory (ROM) connected to the CPU 101, and may be incorporated in the CPU 101. An image pickup element 103 photoelectrically converts an object image transmitted through the lens 200 and outputs an image signal. A shutter 104 shades the image pickup element 103 when not imaging, and opens to guide the object image to the image pickup element 103 when imaging. A motor driver (driving unit) 301 drives a motor 1 to drive a mirror unit 500. An attitude detector 105 detects attitude of the main body 100. A release switch 106 includes a first switch (hereinafter referred to as "SW1") turned on by a half depressing operation and a second switch (hereinafter referred to as "SW2") by a full depressing operation.

The mirror unit 500 is attached in a mirror box 1000. The mirror unit 500 includes a main mirror 501, a main mirror holder 502 that holds the main mirror 501, a sub mirror 503, and a sub mirror holder 504 that holds the sub mirror 503. The main mirror 501 and the main mirror holder 502 form a first mirror member. The sub mirror 503 and the sub mirror holder 504 form a second mirror member. Furthermore, in the mirror box 1000, a mirror up stopper 505 and a mirror down stopper 506 are provided.

Figure 2:
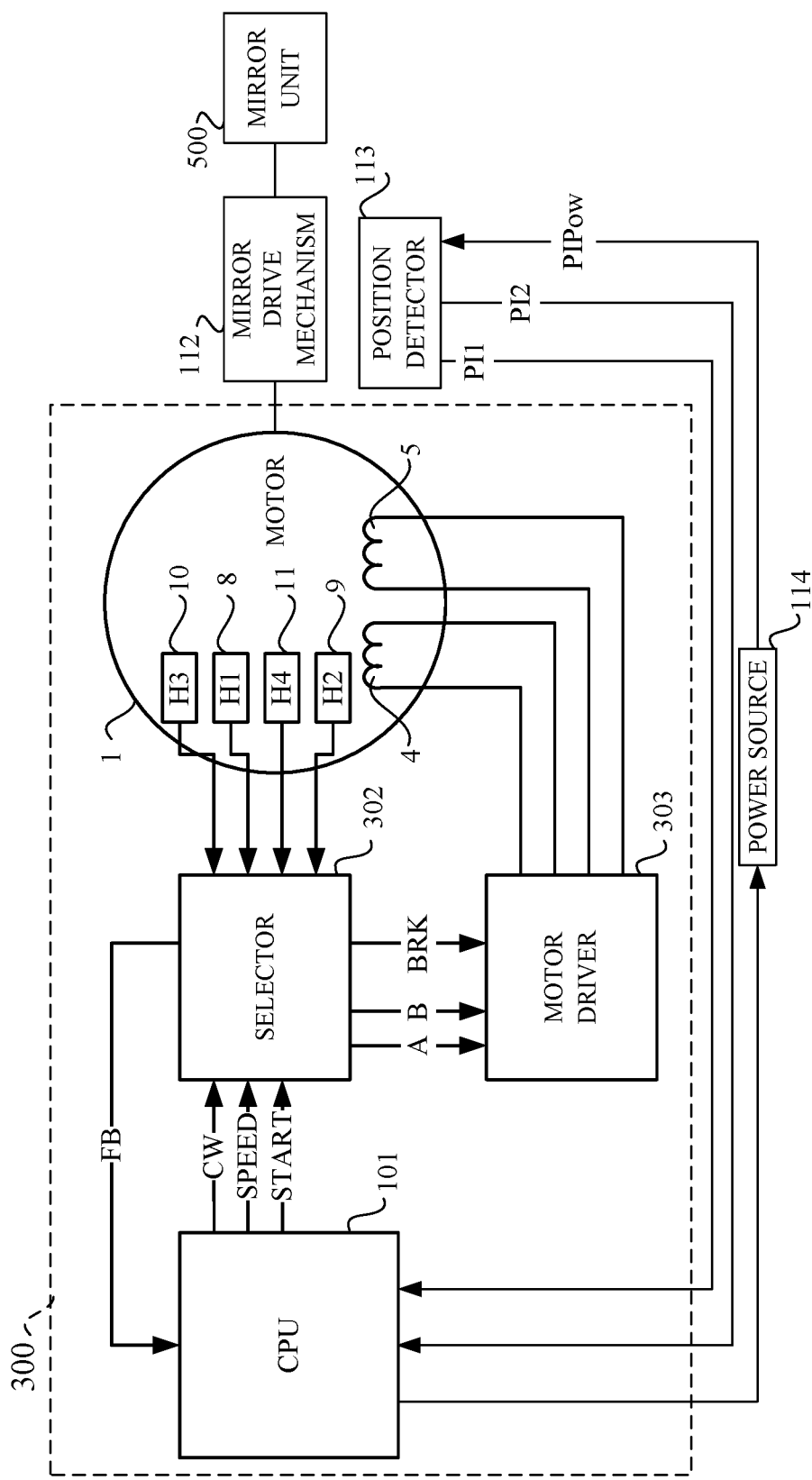
FIG. 2 is a block diagram of a motor driving apparatus.

FIG. 2 is a block diagram of a motor driving apparatus 300. The motor driving apparatus 300 includes the CPU 101, a selector 302, a motor driver 303 and the motor 1. The CPU 101 outputs a control signal of the motor 1. The selector 302 and the motor driver 303 are provided in the motor driver 301. The selector 302 distributes outputs of sensors of the motor 1 and outputs a driving signal of the motor 1 according to instructions of the CPU 101. The motor driver 303 supplies power to the motor 1 on the basis of the driving signal output from the selector 302. A mirror drive mechanism 112 transmits driving force of the motor 1 to a mirror unit 500. A position detector (position detecting unit) 113 detects a position of the mirror unit 500. A power source 114 supplies power to the position detector 113. In this embodiment, the motor driving apparatus 300 drives the mirror unit 500, but may drive a shutter. Additionally, in this embodiment, the CPU 101 controls the motor 1, but a controlling unit having a configuration different from that of the CPU 101 may control the motor 1.

Figure 3:
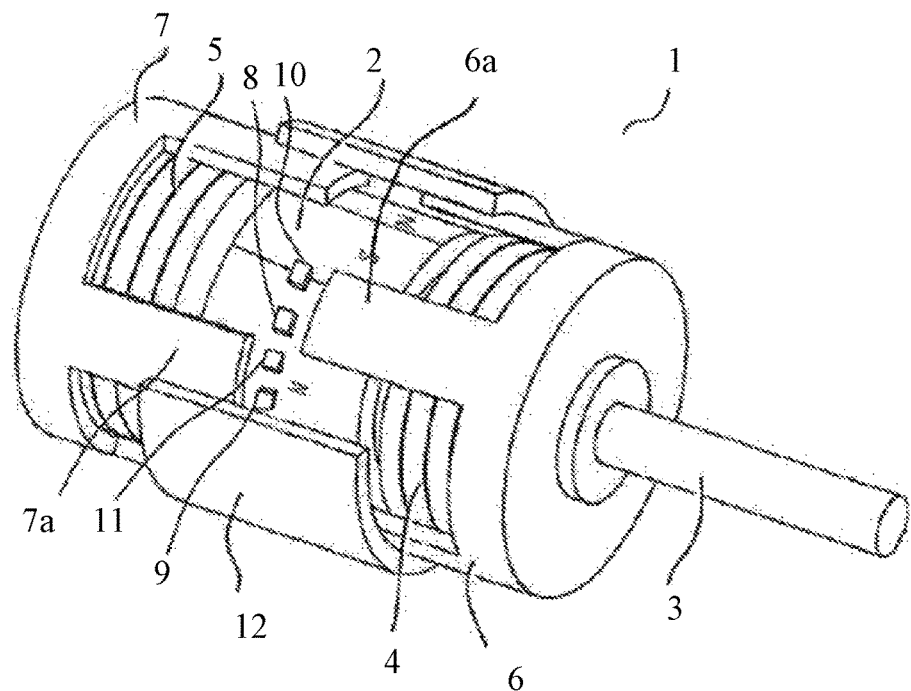
FIG. 3 is an external perspective view of a motor.

FIG. 3 is an external perspective view of the motor 1. In FIG. 3, for purposes of illustration, some parts are broken. A rotor 3 includes a magnet 2 and are controlled in rotation by the motor driver 303. The magnet 2 is formed in a cylindrical shape, and an outer peripheral surface thereof, which is divided in a circumferential direction, is magnetized in multiple poles with alternating different polarities. In this embodiment, the magnet 2 is divided into 8 parts, that is, is magnetized in 8 poles. The magnet 2 may be magnetized not only in 8 poles but also in 4 poles or 12 poles. A first coil 4 is arranged at a first end in an axis direction of the magnet 2. A first yoke 6 is made of a soft magnetic material, and is opposed to the outer peripheral surface of the magnet 2 to form a gap between them. Alternatively, the first yoke 6 includes a plurality of first magnetic pole parts 6a that extend from an annular main body in the axis direction and that are arranged at a predetermined interval in the circumferential direction. The first magnetic pole parts 6a are excited when the first coil 4 is energized. The first coil 4, the first yoke 6 and the magnet 2 opposed to the plurality of first magnetic pole parts 6a form a first stator unit. A second coil 5 is arranged at a second end opposite to the first end, where the first coil 4 is attached, in the axis direction of the magnet 2. A second yoke 7 is made of a soft magnetic material, and is opposed to the outer peripheral surface the magnet 2 to form a gap between them. Alternatively, the second yoke 7 includes a plurality of second magnetic pole parts 7a that extend from an annular main body in the axis direction and that are arranged at a predetermined interval in the circumferential direction. The second magnetic pole parts 7a are excited when the second coil 5 is energized. The second coil 5, the second yoke 7 and the magnet 2 opposed to the plurality of second magnetic pole parts 7a form a second stator unit. Switching each pole (N-pole or S-pole) excited in the first and second magnetic pole parts 6a and 7a can change torque given to the rotor 3.

A first magnetic sensor (first detecting element) 8, a second magnetic sensor (second detecting element) 9, a third magnetic sensor (third detecting element) 10 and a fourth magnetic sensor (fourth detecting element) 11 are sensors such as a hall element, a magnetoresistance effect element (MR element) and an inductive sensor, and are fixed to a motor cover 12. In this embodiment, when a magnetic pole is detected, the first to fourth magnetic sensors 8 to 11 output a signal H1, a signal H2, a signal H3 and a signal H4, respectively. The motor cover 12 firmly holds the first and second yokes 6 and 7 so that the first and second magnetic pole parts 6a and 7a are arranged at positions shifted from a magnetizing phase of the magnet 2 by an electric angle of approximately 90 degrees. The electric angle θ is an angle when one period of magnetic force is expressed as 360 degrees, and is represented by the following expression when the number of magnetic poles of a rotor is M and a mechanical angle is θ0.

$$\theta = \theta_0 \times M/2$$

In this embodiment, as the magnet 2 is magnetized in 8 poles, the electric angle of 90 degrees corresponds to the mechanical angle of 22.5 degrees.

The CPU 101, as illustrated in FIG. 2, performs control instructions of the motor 1 to the selector 302 using three signal lines. A signal line CW is a signal line to indicate a rotational direction of the motor 1. When an output signal level of the signal line CW is "Hi", the motor 1 is rotated rightward (CW) as viewed from a side where the axis of the rotor 3 protrudes, and when the output signal level of the signal line CW is "Low", the motor 1 is rotated leftward (CCW). A signal line SPEED is a signal line to indicate a rotational speed of the motor 1. In this embodiment, two types of speed indications that when an output signal level of the signal line SPEED is "Hi", the motor 1 is rotated at a "high speed", and the output signal level of the signal line SPEED is "Low", the motor 1 is rotated at a "low speed" are performed, but the present invention is not limited to this. For example, an indication capable of arbitrary setting a rotational speed value (rpm) may be performed. A signal line START is a signal line to indicate a start and a stop of a drive of the motor 1. When an output signal level of the signal line START is "Hi", the drive of the motor 1 is started, and when the output signal level of the signal line START is "Low", the drive of the motor 1 is stopped. Providing the signal line SPEED with the function of the signal line START can omit the signal line START.

The selector 302 outputs a feedback (FB) pulse corresponding to a rotational position of the rotor 3 to the CPU 101 through a signal line FB. The CPU 101 obtains a rotational quantity of the motor 1 by counting the FB pulse. The CPU 101 also calculates the rotational speed of the motor 1 on the basis of a pulse width of the FB pulses.

Moreover, the selector 302 outputs a signal A when controlling the first coil 4, and outputs a signal B when controlling the second coil 5. The motor driver 303 supplies power to the first coil 4 when obtaining the signal A, and supplies power to the second coil 5 when obtaining the signal B.

Figure 4:
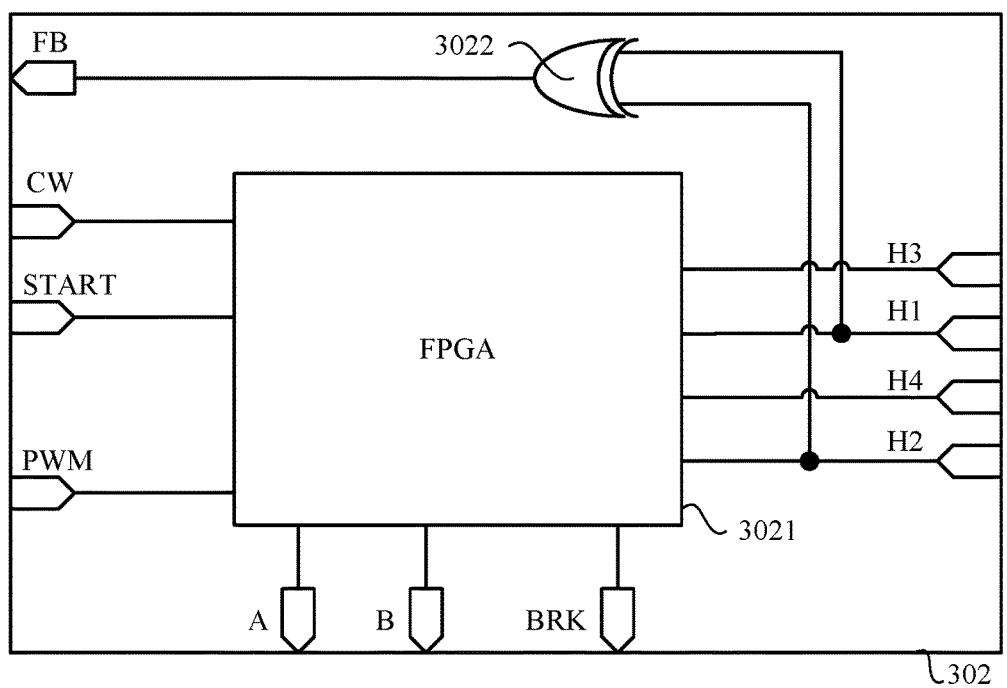
FIG. 4 is an internal circuit diagram of a selector.

FIG. 4 is an internal circuit diagram of the selector 302. The selector 302 includes a logical circuit 3021 such as a field programmable gate array (FPGA) and an exclusive OR circuit 3022. The signals H1 and H2 respectively output from the first and second magnetic sensors 8 and 9 are branched inside the selector 302, and are input to the logical circuit 3021 and the exclusive OR circuit 3022. The signals H3 and H4 respectively output from the third and fourth magnetic sensors 10 and 11 are not branched inside the selector 302, and are only input to the logical circuit 3021. In this embodiment, as each of the signals H1 and H2 is output by 8 pulses during a single revolution of the rotor 3, 16 pulse signals are input to the exclusive OR circuit 3022. A PWM signal is input to the motor driver 303 as a BRK signal through inside the logical circuit 3021.

A Table 1 provides a truth value of the logical circuit 3021. When the output signal level of the CW signal is "Hi" and the output signal level of the SPEED signal is "Hi", the signal A becomes a signal with a reverse phase of the signal H1 and the signal B becomes a signal with the same phase of the signal H2. When the output signal level of the CW signal is "Hi" and the output signal level of the SPEED signal is "Low", the signals A becomes a signal with a reverse phase of the signal H3 and the signal B becomes a signal with the same phase of the signal H4. When the output signal level of the CW signal is "Low" and the output signal level of the SPEED signal is "Hi", the signal A becomes a signal with the same phase of the signal H3 and the signal B becomes a signal with a reverse phase of the signal H4. When the output signal level of the CW signal is "Low" and the output signal level of the SPEED signal is "Low", the signals A becomes a signal with the same phase of the signal H1 and the signal B becomes a signal with a reverse phase of the signal H2.

TABLE 1

| CW | SPEED | A | B |
|---|---|---|---|
| Hi:CW | High Speed | Reverse phase of signal H1 | Same phase of signal H2 |
| Hi:CW | Low Speed | Reverse phase of signal H3 | Same phase of signal H4 |
| Low:CCW | High Speed | Same phase of signal H3 | Reverse phase of signal H4 |
| Low:CCW | Low Speed | Same phase of signal H1 | Reverse phase of signal H2 |

In other words, the motor driver 303 controls the drive of the motor 1 as follows.

When the rotational direction is the clockwise direction and the rotational speed is the high speed, the motor driver 303 supplies power to the first coil 4 on the basis of the signal H1 output from the first magnetic sensor 8, and supplies power to the second coil 5 on the basis of the signal H2 output from the second magnetic sensor 9.

When the rotational direction is the clockwise direction and the rotational speed is the low speed, the motor driver 303 supplies power to the first coil 4 on the basis of the signal H3 output from the third magnetic sensor 10, and supplies power to the second coil 5 on the basis of the signal H4 output from the fourth magnetic sensor 11.

When the rotational speed is the high speed, the motor driver 303 supplies power to the first coil 4 on the basis of the signal H3 output from the third magnetic sensor 10, and supplies power to the second coil 5 on the basis of the signal H4 output from the fourth magnetic sensor 11.

When the rotational direction is the counterclockwise direction and the rotational speed is the low speed, the motor driver 303 supplies power to the first coil 4 on the basis of the signal H1 output from the first magnetic sensor 8, and supplies power to the second coil 5 on the basis of the signal H2 output from the second magnetic sensor 9.

Herein, the clockwise direction corresponds to a first direction, and the counterclockwise direction corresponds to a second direction opposite to the first direction. The rotational speed where the rotational direction is the clockwise direction and the rotational speed is the high speed corresponds to a first speed, and the rotational speed where the rotational direction is the clockwise direction and the rotational speed is the low speed corresponds to a second speed lower than the first speed. The rotational speed where the rotational direction is the counterclockwise direction and the rotational speed is the high speed corresponds to a third speed, and the rotational speed where the rotational direction is the counterclockwise direction and the rotational speed is the low speed corresponds to a fourth speed lower than the third speed.

In this embodiment, the first speed is almost the same as the third speed, and the second speed is almost the same as the fourth speed.

Figure 5A:
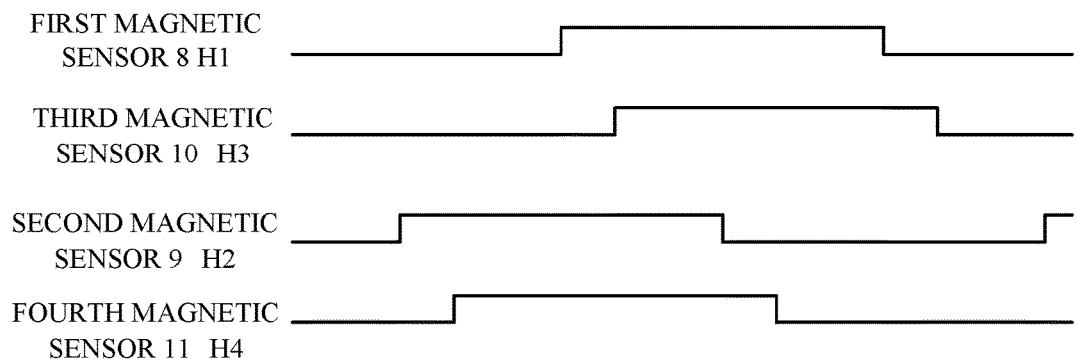
FIGS. 5A to 5C are waveforms of a phase variation of each signal.
Figure 5B:
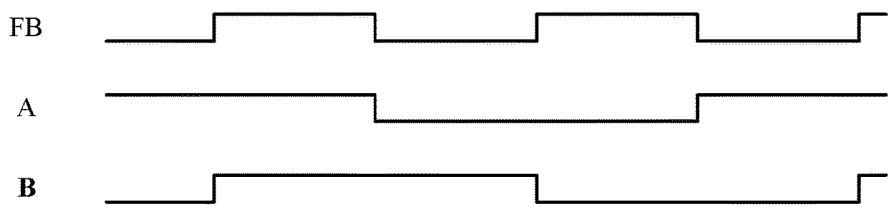
Figure 5C:
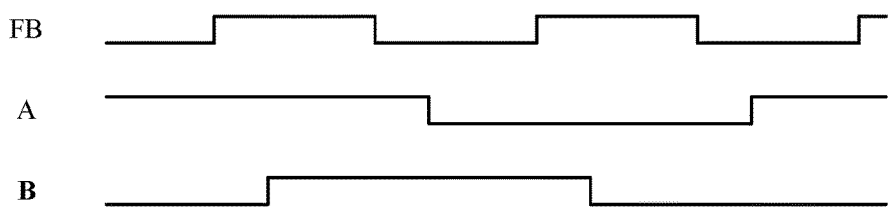
Figure 6A:
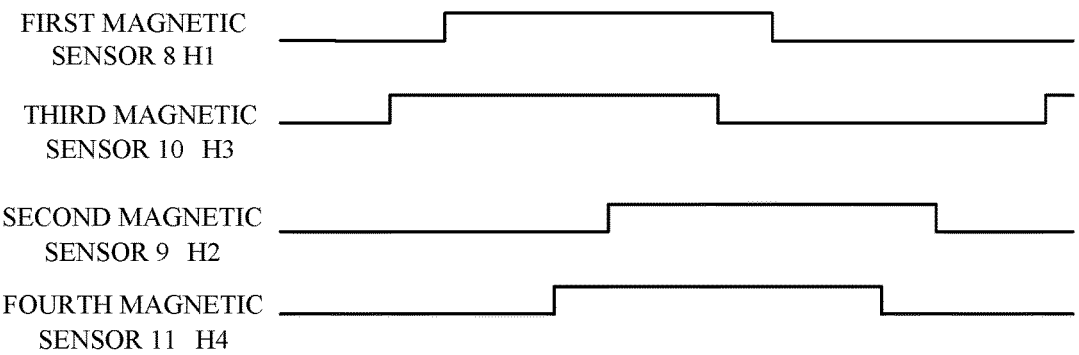
FIGS. 6A to 6C are waveforms of a phase variation of each signal.
Figure 6B:
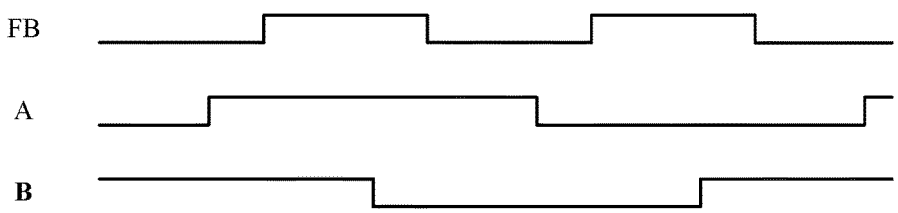
Figure 6C:
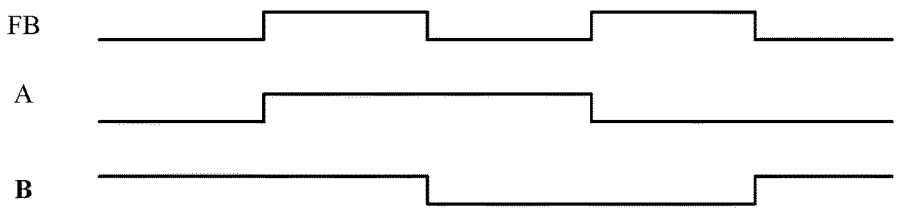
Figure 7A:
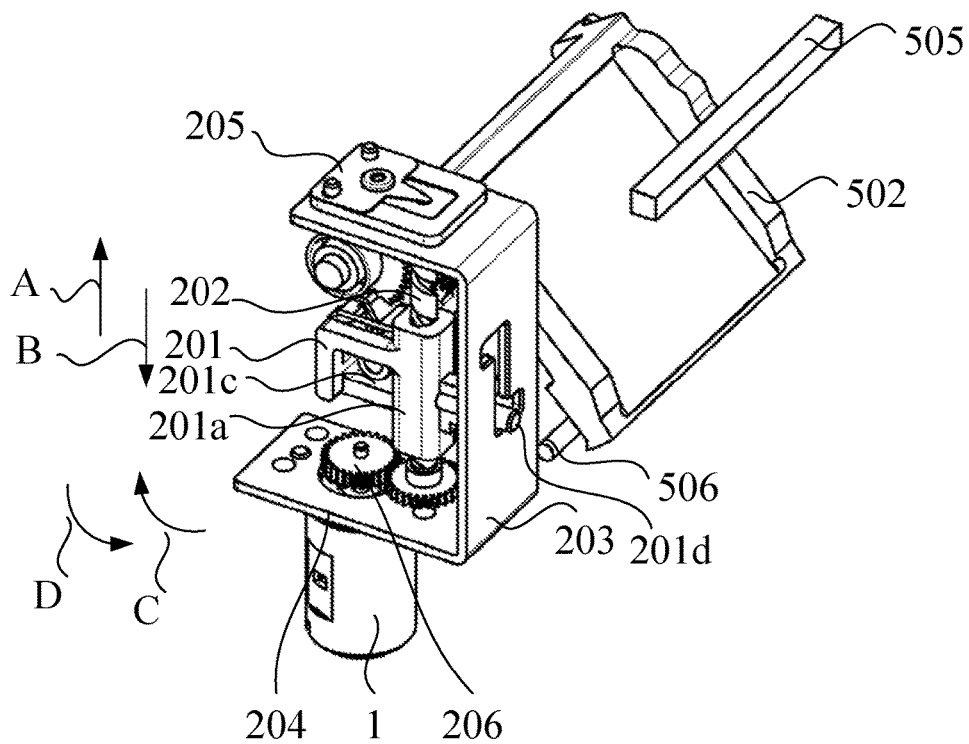
FIGS. 7A to 7D are explanatory views of a mirror drive mechanism (first example).
Figure 7B:
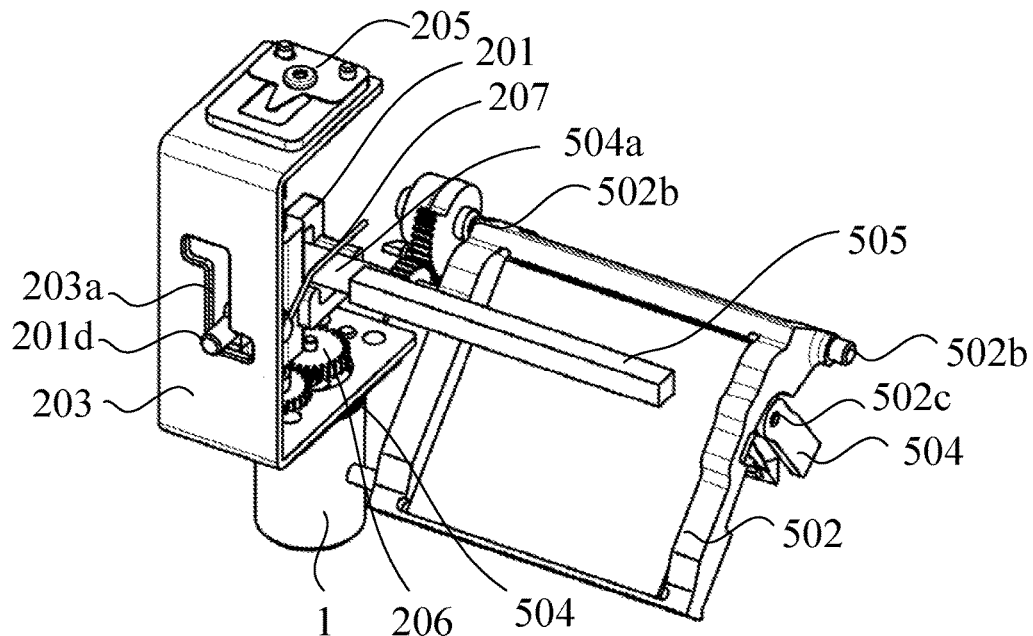
Figure 7C:
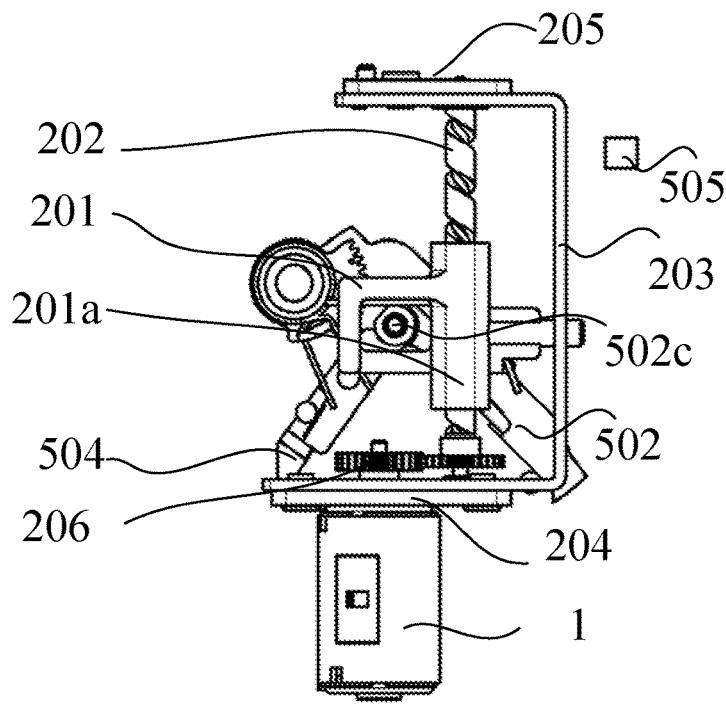
Figure 7D:
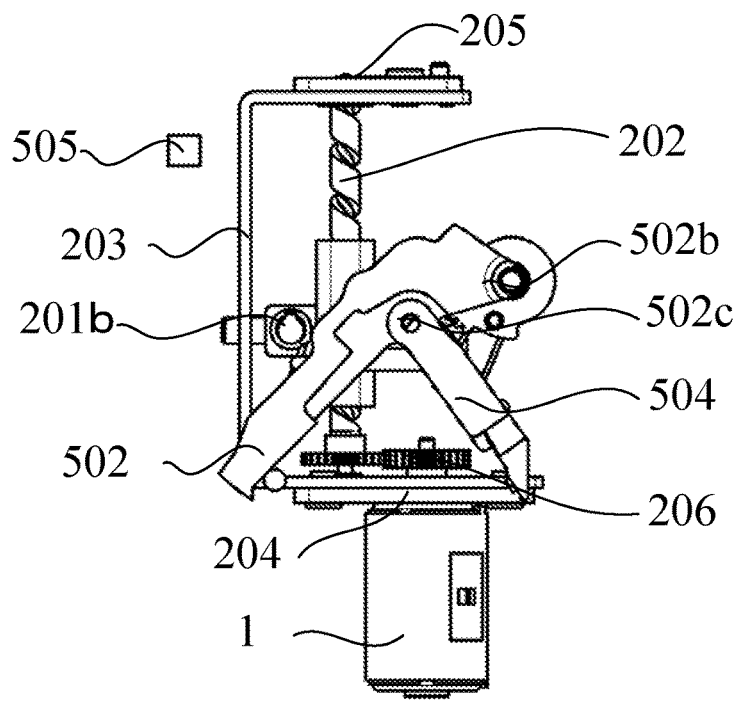

With reference to FIGS. 5A to 5C and FIGS. 6A to 6C, the signal output from each magnetic sensor while the rotor 3 rotates will be explained. FIGS. 5A to 5C are waveforms of a phase variation of each signal when the CPU 101 sets the output signal level of the CW signal to "Hi". FIGS. 6A to 6C are waveforms of a phase variation of each signal when the CPU 101 sets the output signal level of the CW signal to "Low". In FIGS. 5A to 5C and FIGS. 6A to 6C, as advancing to the right side, time proceeds.

When the output signal level of the CW signal is "Hi", the motor 1 performs the clockwise rotation (normal rotation) as viewed from the side where the axis of the rotor 3 protrudes. FIG. 5A illustrates the phase of the signal output from each magnetic sensor. As illustrated in FIG. 5A, when each magnetic sensor detects the N pole of the magnet 2, the output signal level of the signal output from each magnetic sensor becomes "Hi", and each magnetic sensor detects the S pole of the magnet 2, the output signal level of the signal output from each magnetic sensor becomes "Low". Firstly, when the second magnetic sensor 9 approaches to the N pole, the output signal level of the signal H2 changes to "Hi". Subsequently, when the fourth magnetic sensor 11 approaches to the N pole, the output signal level of the signal H4 changes to "Hi". Similarly, when the first magnetic sensor 8 approaches to the N pole, the output signal level of the signal H1 changes to "Hi", and when the third magnetic sensor 10 approaches to the N pole, the output signal level of the signal H3 changes to "Hi".

FIG. 5B illustrates the FB pulse and the signals A and B when the CPU 101 sets the output signal levels of the CW signal and the SPEED signal to "Hi" to rotate the motor 1 at the high speed. The FB pulse is a composite signal obtained by executing the exclusive OR of the signal H1 output from the first magnetic sensor 8 and the signal H2 output from the second magnetic sensor 9, and is the pulse signal corresponding to the rotational position of the rotor 3. In this embodiment, the FB pulse is the composite signal obtained by executing the exclusive OR of the signals H1 and H2, but the present invention is not limited to this. As calculation becomes easy if phase differences between the signals are 45 degrees like this embodiment, the FB pulse may be obtained using a composite signal based on the signal H3 output from the third magnetic sensor 10 and the signal H4 output from the fourth magnetic sensor 11. As the output signal levels of the CW signal and the SPEED signal are "Hi", the signal A becomes the signal with the reverse phase of the signal H1 and the signal B becomes the signal with the same phase of the signal H2 according to the table 1.

FIG. 5C illustrates the FB pulse and the signals A and B when the CPU 101 set the output signal level of the CW signal to "Hi" and the output signal level of the SPEED signal to "Low" to rotate the motor 1 at the low speed. The FB pulse is the composite signal obtained by executing the exclusive OR of the signal H1 output from the first magnetic sensor 8 and the signal H2 output from the second magnetic sensor 9, and is the pulse signal corresponding to the rotational position of the rotor 3. As the signal levels of the CW signal and the SPEED signal are respectively "Hi" and "Low", the signal A becomes the signal with the reverse phase of the signal H3 and the signal B becomes the signal with the same phase of the signal H4.

When the output signal level of the CW signal is "Low", the motor 1 performs the counterclockwise rotation (reverse rotation) as viewed from the side where the axis of the rotor 3 protrudes. FIG. 6A illustrates the phase of the signal output from each magnetic sensor. As illustrated in FIG. 6A, when each magnetic sensor detects the N pole of the magnet 2, the output signal level of the signal output from each magnetic sensor becomes "Hi", and each magnetic sensor detects the S pole of the magnet 2, the output signal level of the signal output from each magnetic sensor becomes "Low". Firstly, when the third magnetic sensor 10 approaches to the N pole, the output signal level of the signal H3 changes to "Hi". Subsequently, when the first magnetic sensor 8 approaches to the N pole, the output signal level of the signal H1 changes to "Hi". Similarly, when the fourth magnetic sensor 11 approaches to the N pole, the output signal level of the signal H4 changes to "Hi", and when the second magnetic sensor 9 approaches to the N pole, the output signal level of the signal H2 changes to "Hi".

FIG. 6B illustrates the FB pulse and the signals A and B when the CPU 101 sets the output signal level of the CW signal to "Low" and the output signal level of the SPEED signal to "Hi" to rotate the motor 1 at the high speed. The FB pulse is the composite signal obtained by executing the exclusive OR of the signal H1 output from the first magnetic sensor 8 and the signal H2 output from the second magnetic sensor 9, and is the pulse signal corresponding to the rotational position of the rotor 3. As the output signal levels of the CW signal and the SPEED signal are respectively "Low" and "Hi", the signal A becomes the signal with the same phase of the signal H3 and the signal B becomes the signal with the reverse phase of the signal H4.

FIG. 6C illustrates the FB pulse and the signals A and B when the CPU 101 sets the output signal levels of the CW signal and the SPEED signal to "Low" to rotate the motor 1 at the low speed. The FB pulse is the composite signal obtained by executing the exclusive OR of the signal H1 output from the first magnetic sensor 8 and the signal H2 output from the second magnetic sensor 9, and is the pulse signal corresponding to the rotational position of the rotor 3. As the output signal levels of the CW signal and the SPEED signal are "Low", the signal A becomes the signal with the same phase of the signal H1 and the signal B becomes the signal with the reverse phase of the signal H2.

As explained above, the signals A and B shift with respect to a positional relation of the magnet 2 according to the driving mode, but the FB pulse does not shift with respect to the positional relation of the magnet 2 in either of the driving modes.

First Example

With reference to FIGS. 7A to 7D, the mirror drive mechanism 112 will be explained. FIGS. 7A to 7D are explanatory views of the mirror drive mechanism 112. The mirror drive mechanism 112 includes a mirror drive holder (mirror driving unit) 201, a lead screw 202 and a drive unit base 203.

The mirror drive holder 201 holds the main mirror holder 502. The main mirror holder 502 is provided with an axis part 502c that rotatably supports the sub mirror holder 504. The sub mirror holder 504 is provided with a driving pin 504a that is arranged coaxially with the axis part 502c. The mirror holder 201 includes a drive nut part 201a engaged with the lead screw 202, a spring mount part 201b where a winding part of a torsion spring 207 is freely fitted, a driving pin engaging part 201c where the driving pin 504a is inserted, and a protruding part 201d.

The lead screw 202, a motor base 204 holding the motor 1, and a plate spring 205 urging the lead screw 202 to the motor 1 are attached to the drive unit base 203. A pinion gear 206 is fixed to a rotational axis of the motor 1. When the motor 1 rotates, the lead screw 202 rotates in an arrow C direction or an arrow D direction. Additionally, when the protruding part 201d is guided by a regulating groove 203a formed on the drive unit base 203, the mirror drive holder 201 moves linearly in an arrow A direction or an arrow B direction, or rotates in the arrow C direction or the arrow D direction. When the mirror drive holder 201 moves linearly in the arrow A direction or the arrow B direction, the main mirror holder 502 rotates around a rotational axis 502b between a mirror down position where the main mirror holder 502 is positioned in an image pickup optical path and a mirror up position where the main mirror holder 502 is positioned outside the image pickup optical path.

A first end of the torsion spring (urging unit) 207 is hooked on the mirror drive holder 201, and a second end of the torsion spring 207 is hooked on the driving pin 504a. When the torsion spring 207 urges the driving pin 504a to the driving pin engaging part 201c, the main mirror holder 502 abuts against the mirror down stopper 506 and is held at the mirror down position.

Next, with reference to FIGS. 8A to 8E, a rotational operation of the mirror unit 500 and a sun gear 208 will be explained. FIGS. 8A to 8E are explanatory views of an operation of the mirror unit 500 and the sun gear 208. The sun gear 208 is rotatably supported coaxially with the rotational axis 502b of the main mirror holder 502 by an axis part 1000a provided in the mirror box 1000. A sun gear urging spring 209 has a torsion spring shape and abuts against a sun gear protruding part 208b and a spring hook dowel 1000b formed on the mirror box 1000 to urge the sun gear 208 in the clockwise direction or the counterclockwise direction. In this example, the axis part 1000a provided in the mirror box 1000 is used as the rotational axis of the sun gear 208, but the rotational axis 502b of the main mirror holder 502 may be extended to use as the rotational axis of the sun gear 208.

FIG. 8A illustrates a state where the mirror unit 500 is positioned at the mirror down position. Then, a first end 209a of the sun gear urging spring 209 urges the spring hook dowel 1000b to rotate the sun gear 208 in the counterclockwise direction. Thus, the sub mirror holder 504 is urged around the axis part 502c in the clockwise direction, and a position of the sub mirror holder 504 is regulated to abut against a sub mirror stopper 507. When the motor 1 drives from the state of FIG. 8A, the main mirror holder 502 starts rotation in the counterclockwise direction.

When the main mirror holder 502 rotates by a minute angle in the counterclockwise direction from the state of FIG. 8A, the mirror unit 500 becomes in the state of FIG. 8B where the sun gear urging spring 209 does not urge the spring hook dowel 1000b. As the sun gear urging spring 209 does not urge the spring hook dowel 1000b, the rotation of the sun gear 208 stops.

When the main mirror holder 502 rotates in the counterclockwise direction from the state of FIG. 8B, the mirror unit 500 becomes in the state of FIG. 8C. During the rotation of the main mirror holder 502, a sub mirror gear part 504b of the sub mirror holder 504 meshes with a sun gear part 208a of the sun gear 208, and the sub mirror holder 504 rotates through the sun gear 208. Accordingly, a drive load to the driving pin 504a by reverse of the sub mirror holder 504 and a load to the motor 1 are smoothed, and thus, the occurrence of loss of synchronization during driving of the motor 1 can be suppressed. Moreover, the drive load to the driving pin 504a is determined by the moment of inertia due to the rotation of the sub mirror holder 504 and a gear ratio between the sun gear part 208a and the sub mirror gear part 504b.

When the main mirror holder 502 rotates in the counterclockwise direction from the state of FIG. 8C, the mirror unit 500 becomes in the state of FIG. 8D where the sub mirror holder 504 abuts against a back face part 502d of the main mirror holder 502.

When the main mirror holder 502 rotates in the counterclockwise direction from the state of FIG. 8D, a second end 209b of the sun gear urging spring 209 urges the spring hook dowel 1000b to rotate the sun gear 208 in the clockwise direction. Additionally, the sun gear 208 receives rotary torque from the sub mirror gear part 504b and thus rotates in the counterclockwise direction. When the main mirror holder 502 abuts against the mirror up stopper 505, the main mirror holder 502 and the sun gear 208 stop the rotation, and the mirror unit 500 becomes in the state of FIG. 8E. In the state of FIG. 8E, the second end 209b urges the spring hook dowel 1000b, and thus the position of the sub mirror holder 504 is regulated to abut against the back face part 502d.

The rotation (mirror down drive) of the mirror unit 500 from the mirror up position to the mirror down position is reverse drive of the rotation (mirror up drive) of the mirror unit 500 from the mirror down position to the mirror up position, and thus an explanation thereof is omitted. That is, the main mirror holder 502, the sub mirror holder 504 and the sun gear 208 are operated from the state of FIG. 8E to the state of FIG. 8A.

As explained above, in this example, when the sub mirror gear part 504b meshes with the sun gear part 208a, the sub mirror holder 504 rotates in response to the rotation of the main mirror holder 502. That is, rotating the sub mirror holder 504 by gear interlocking can smooth the load to the mirror drive holder 201, the motor 1 and the mirror unit 500 due to the rotation of the sub mirror holder 504. Thus, the main mirror holder 502 can rotate smoothly.

Meshing parts of the sun gear part 208a and the sub mirror gear part 504b are preferably provided outside the mirror box 1000. Providing each meshing part outside the mirror box 1000 can prevent photographic light flux, which is transmitted through the lens 200, from being reflecting by the sun gear part 208a and the sub mirror gear part 504b to being guided to the image pickup element 103.

Figure 9B:
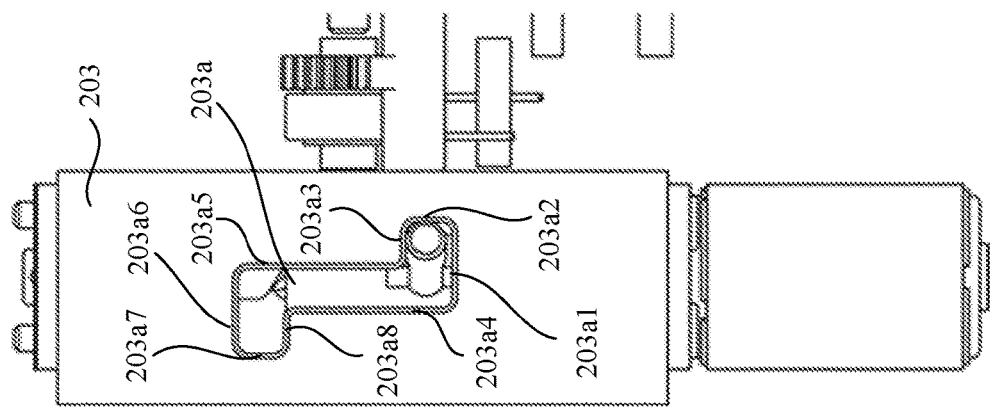
FIGS. 9A to 9D are explanatory views of drive of a mirror drive mechanism (first example).
Figure 9A:
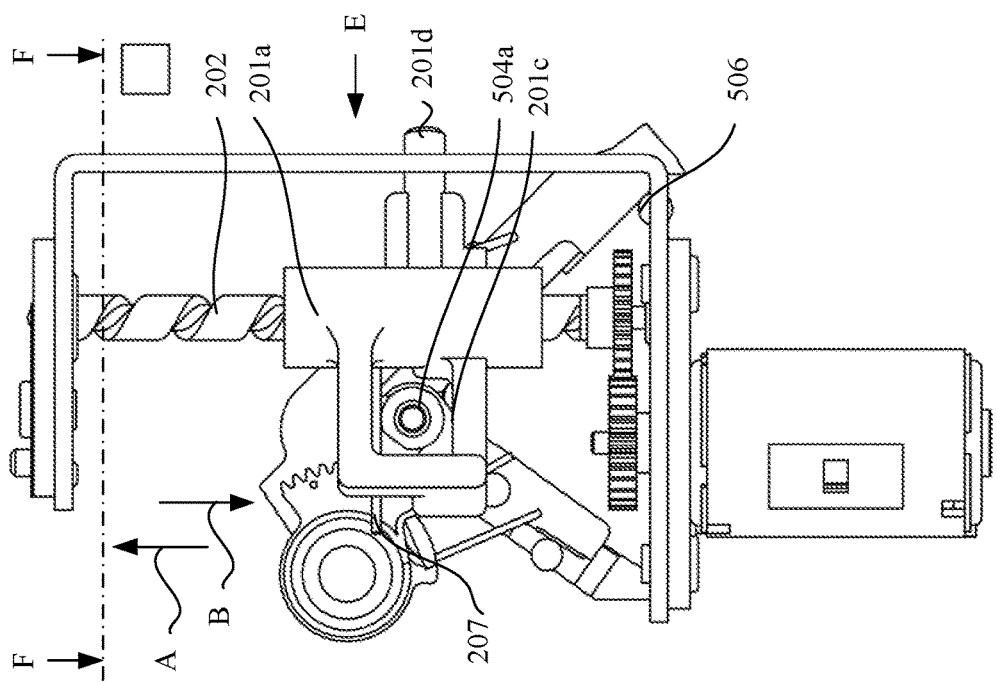
Figure 9D:
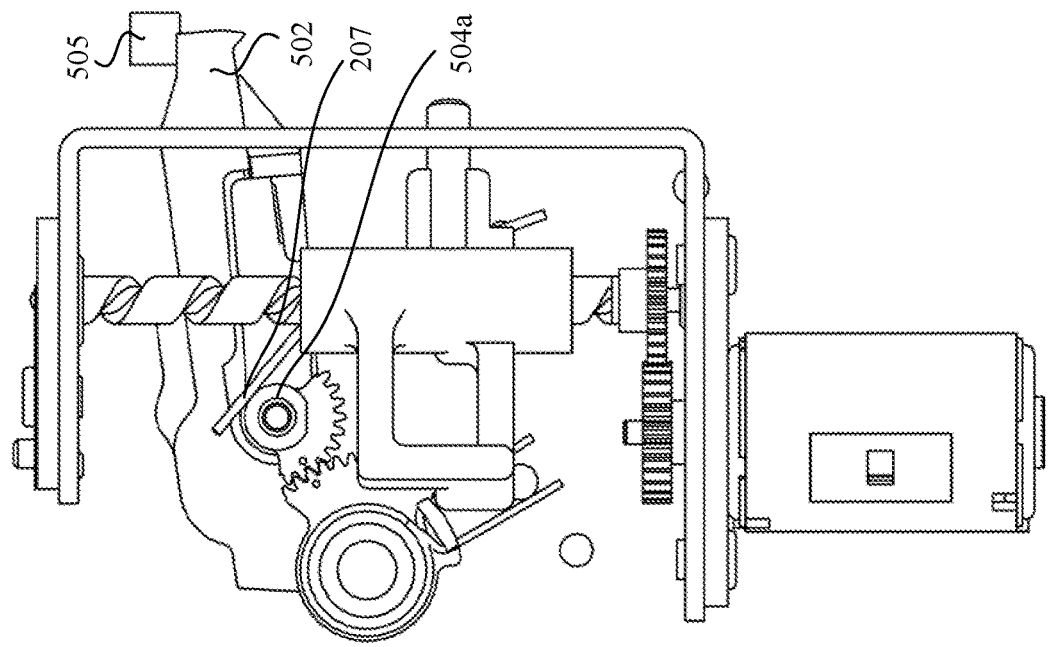
Figure 9C:
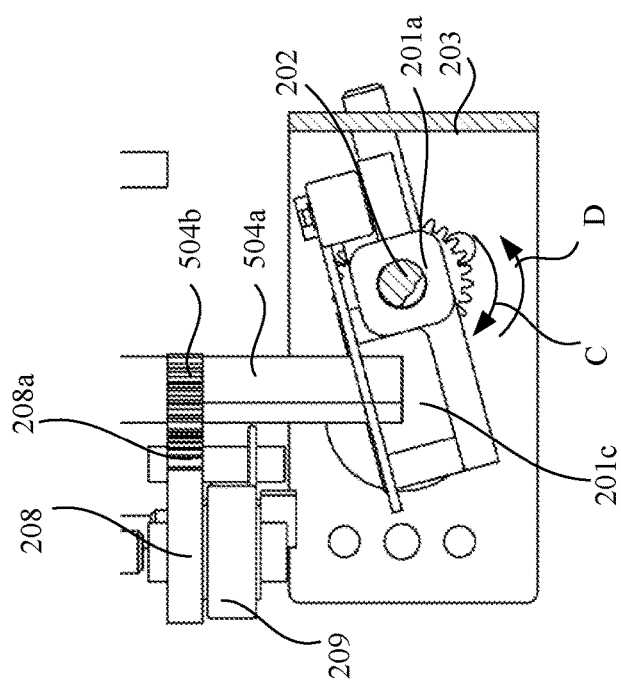

Next, with reference with FIGS. 9A to 9D, the drive of the mirror drive mechanism 112 will be explained. FIGS. 9A to 9D are explanatory views of the drive of the mirror drive mechanism. FIG. 9A illustrates the state where the mirror unit 500 is positioned at the mirror down position, FIG. 9B is a view of FIG. 9A viewed from an arrow E direction, and FIG. 9C is a sectional view taken along line F-F of FIG. 9A. FIG. 9D illustrates a state where the mirror up unit 500 is positioned at the mirror up position when the mirror drive holder 201 is positioned at a position of FIGS. 9A to 9C.

When the mirror unit 500 is positioned at the mirror down position, the main mirror holder 502 abuts against the mirror down stopper 506, and the driving pin 504a does not abut against the driving pin engaging part 201c. Accordingly, the main mirror holder 502 is positioned by the mirror down stopper 506 and the rotational axis 502b at the mirror down position. Furthermore, the sub mirror holder 504 is urged in the clockwise direction and the position of the sub mirror holder 504 is regulated to abut against the sub mirror stopper 507. Thus, by attachment error and component tolerance of the mirror unit 500, the positions of the main mirror holder 502 and the sub mirror holder 504 does not vary from the mirror down position.

On the regulating groove 203a of the drive unit base 203, first to eighth surfaces 203a1 to 203a8 are formed. The first surface 203a1, the third surface 203a3, the sixth surface 203a6 and the eighth surface 203a8 are formed to be substantially orthogonal to an axis direction of the lead screw 202. The second surface 203a2, the fourth surface 203a4, the fifth surface 203a5 and the seventh surface 203a7 are formed substantially in parallel with the axis direction of the lead screw 202. When the lead screw 202 meshed with the drive nut part 201a is attached to the drive unit base 203, the protruding part 201d of the mirror drive holder 201 engages with the regulating groove 203a. When the mirror unit 500 is positioned at the mirror down position, the protruding part 201d abuts against the second and third surfaces 203a2 and 203a3 of the regulating groove 203a, and a straight advance movement in the arrow A direction and a rotary movement in the arrow D direction of the mirror drive holder 201 are regulated. Thus, as the state where the mirror unit 500 is positioned at the mirror down position can be maintained without energizing the motor 1, a drive source to hold the mirror unit 500 at the mirror down position is not required.

In this example, while the mirror unit 500 drives between the mirror down position and the mirror up position, the mirror drive holder 201 can move linearly, but is regulated to rotate by the regulating groove 203a. When the mirror unit 500 is positioned at the mirror down position or the mirror up position, the mirror drive holder 201 can rotate, but is regulated to move linearly by the regulating groove 203a.

As illustrated in FIG. 9D, when the main mirror holder 502 moves at the mirror up position by force from the outside such as a user, the second end of the torsion spring 207 hooked on the driving pin 504a moves with a movement of the driving pin 504a. When the main mirror holder 502 is not held at the mirror up position by the force from the outside, the torsion spring 207 urges the driving pin 504a to the driving pin engaging part 201c, and the mirror unit 500 becomes in the state of FIG. 9A.

Figure 10A:
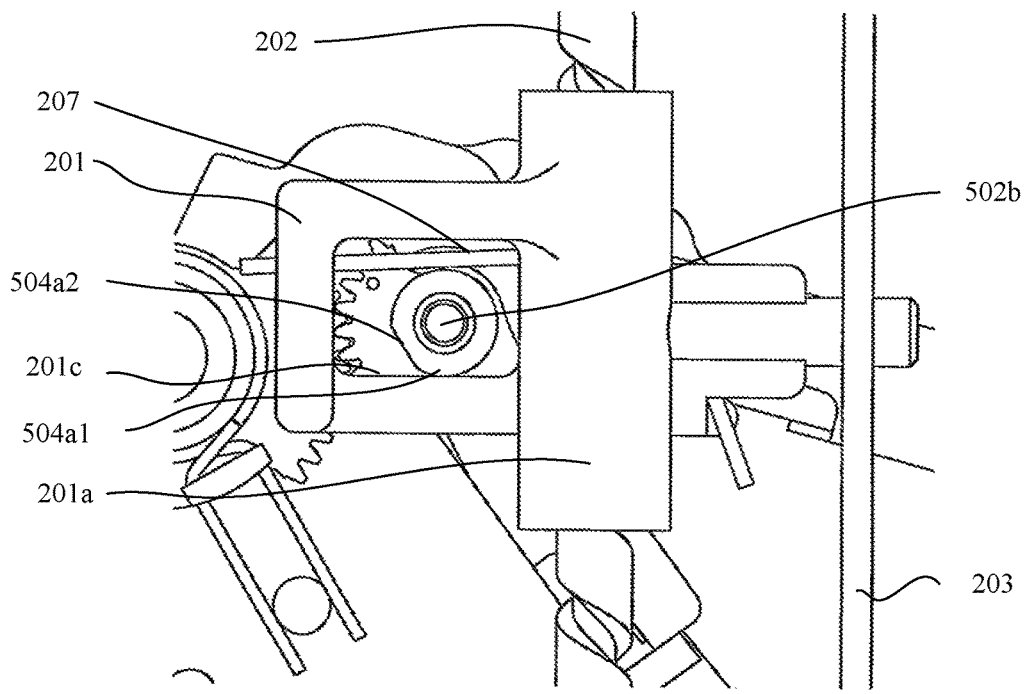
FIGS. 10A and 10B are explanatory views of a bound reduction structure of a sub mirror holder (first example).
Figure 10B:
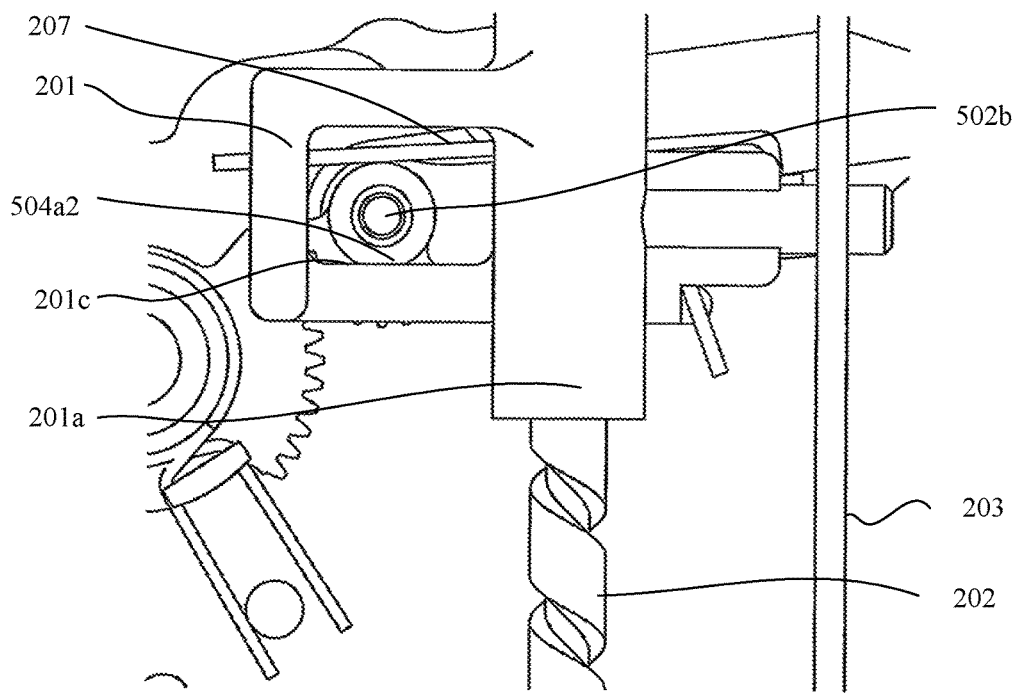

Next, with reference to FIGS. 10A and 10B, a reduction structure to reduce a bound in the case where the sub mirror holder 504 abuts against the back face part 502d of the main mirror holder 502 during the mirror up drive will be explained. FIGS. 10A and 10B are explanatory views of a bound reduction structure of the sub mirror holder 504 during the mirror up drive. FIG. 10A is a partial enlarged view of the mirror unit 500 during the mirror up drive. FIG. 10B is a partial enlarged view of the mirror unit 500 positioned at the mirror up position.

When the mirror unit 500 reaches the mirror up position, the sub mirror holder 504 is urged in the counterclockwise direction by the sun gear urging spring 209 while abutting against the back face part 502d. However, suppressing the bound generated in the sub mirror holder 504 is difficult by the sun gear urging spring 209 only when the mirror unit 500 reaches the mirror up position. In this example, the driving pin 504a is provided with the reduction structure that can reduce the bound of the sub mirror holder 504 during the mirror up drive. As a center of the driving pin 504a is substantially concentric with a rotating center of the sub mirror holder 504, the driving pin 504a rotates with the rotation of the sub mirror holder 504. The driving pin 504a is provided with an abutting part 504a1 abutting against the driving pin engaging part 201c while the driving pin 504a rotates. The abutting part 504a1 is provided with a planer flat part 504a2 that abuts against the driving pin engaging part 201c when the mirror unit 500 reaches the mirror up position. Abutting the flat part 504a2 abuts against the driving pin engaging part 201c when the mirror unit 500 reaches the mirror up position suppresses the rotation of the driving pin 504a and also suppresses the rotation of the sub mirror holder 504. A part connected to an arc part of the driving part 504a and the flat part 504a2 is formed so that a distance from a center of the driving pin 504a decreases as the flat part 504a is approached. Thus, when the mirror unit 500 reaches the mirror up position, a sudden brake to the sub mirror holder 504 is not worked and thus the bound of the sub mirror holder 504 can be suppressed. On the driving pin 504a, a friction surface having coefficient of friction higher than that of other parts of the driving part 504a may be formed instead of the flat part 504a2.

In this example, the mirror unit 500 moves linearly by the lead screw 202, but the present invention is not limited to this. For example, the main mirror holder 502 may be rotated by sandwiching the driving pin 504a using a cam rotating by the drive of the motor 1.

Second Example

Figure 11C:
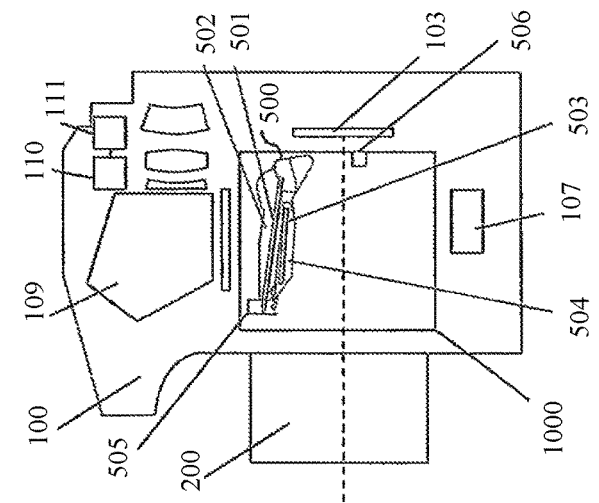
FIGS. 11A to 11C are explanatory diagrams of mirror drive (second and third examples).
Figure 11B:
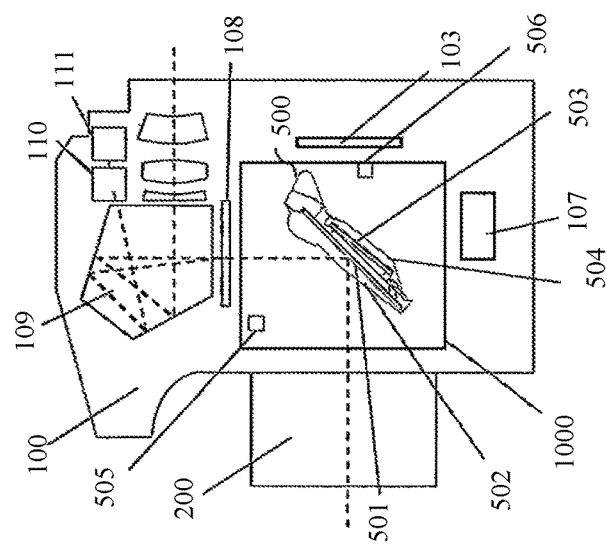
Figure 11A:
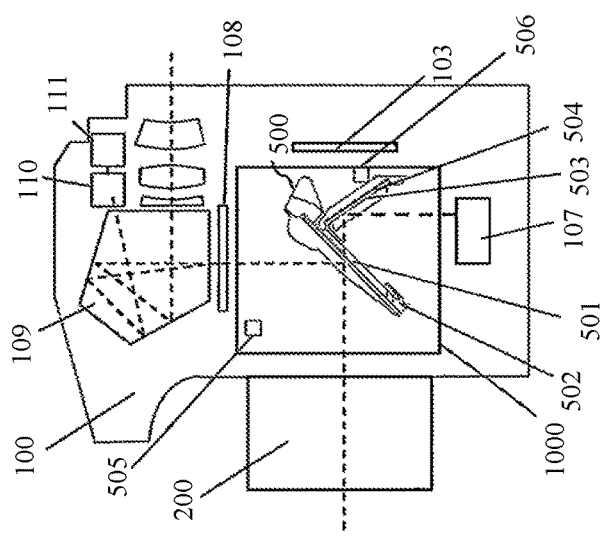

With reference to FIGS. 11A to 11C, an adjustment method of drive control (mirror drive control) of the mirror unit 500 will be explained. FIGS. 11A to 11C are explanatory diagrams of the mirror drive.

FIG. 11A illustrates a mirror down state (hereinafter referred to as "first state") where the main mirror holder 502 and the sub mirror holder 504 are arranged in an image pickup optical path, that is, are arranged at a mirror down position. When the mirror unit 500 is in the first state, the photographing light flux transmitted through the lens 200 is separated by the main mirror 501. The photographing light flux reflected by the main mirror 501 is imaged on a focusing plate 108. A pentaprism 109 guides an object image imaged on the focusing plate 108 to a photometric sensor 110. The photometric sensor 110 detects a part of the object image using a light receiving element divided to correspond to each area on a viewing screen. A photometric circuit 111 converts an output signal obtained from the photometric sensor 110 into a luminance signal of each area on the viewing screen. Instead of separately forming the photometric sensor 110 and the photometric circuit 111, they may be formed as one photometric unit. The CPU 101 calculates an exposure value on the basis of the luminance signal obtained from the photometric sensor 111. When the mirror unit 500 is in the first state, in the photographing light flux incident on the photometric sensor 110, no unevenness in luminance among areas on a light receiving surface is substantially contained. Meanwhile, the photographing light flux transmitted through the main mirror 501 is reflected by the sub mirror 503 to be guided to a focusing detector (focusing detecting unit) 107.

FIG. 11B illustrates a state (hereinafter referred to as "second state") where the main mirror holder 502 is arranged at the mirror down position and the sub mirror holder 504 is raised at a position overlapping the main mirror 501. When the mirror unit 500 is in the second state, the photographing light flux transmitted through the lens 200 is reflected by the main mirror 501 and the sub mirror 503, and is imaged on the focusing plate 108 without being guided to the focusing detector 107. When the mirror unit 500 is in the second state, the photographing light flux is not guided to the focusing detector 107, and thus a light quantity to a central part of the photometric sensor 110 increases. Accordingly, photometric accuracy under a low luminance environment can be increased. Additionally, a light quantity of a finder image which a photographer can confirms through a finder eyepiece (not illustrated) lightens, and as visibility of an object increases, focus adjustment by a manual operation also becomes easy.

FIG. 11C illustrates a state (hereinafter referred to as "third state") where the main mirror holder 502 and the sub mirror holder 504 are arranged outside the image pickup optical path, that is, are arranged at the mirror up position. When the mirror unit 500 is in the third state, the mirror unit 500 retreats from the image pickup optical path, and thus the light transmitted through the lens 200 is guided to the image pickup element 103.

The mirror unit 500 performs the mirror down drive to be in the third state from the first state through the second state, and the mirror up drive to be in the first state from the third state through the second state using the motor driving apparatus 300. The position detector 113 detects whether the mirror unit 500 is in the first state or the third state.

Figure 12A:
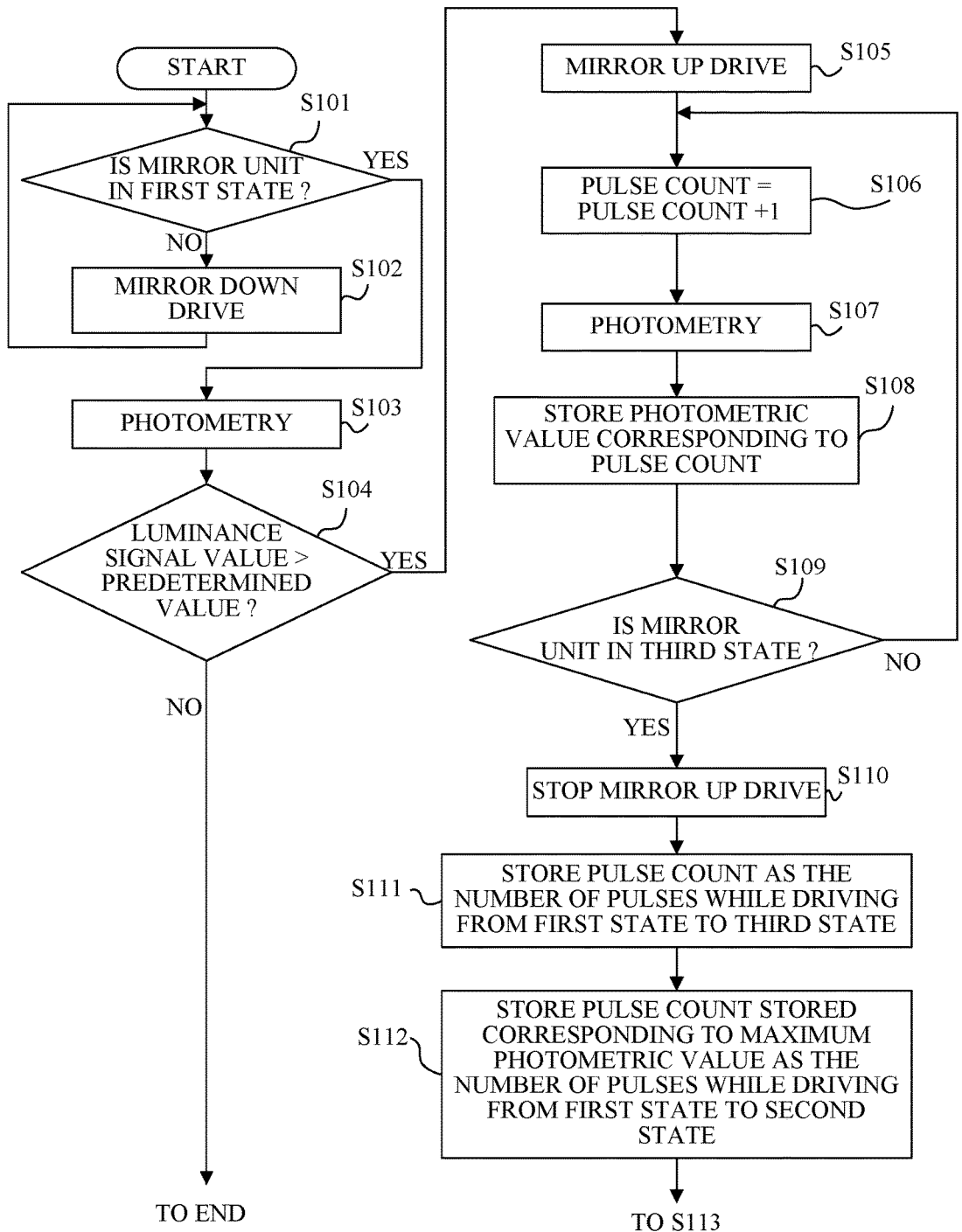
FIGS. 12A and 12B are flowcharts of an adjustment method of mirror drive control (second example).
Figure 12B:
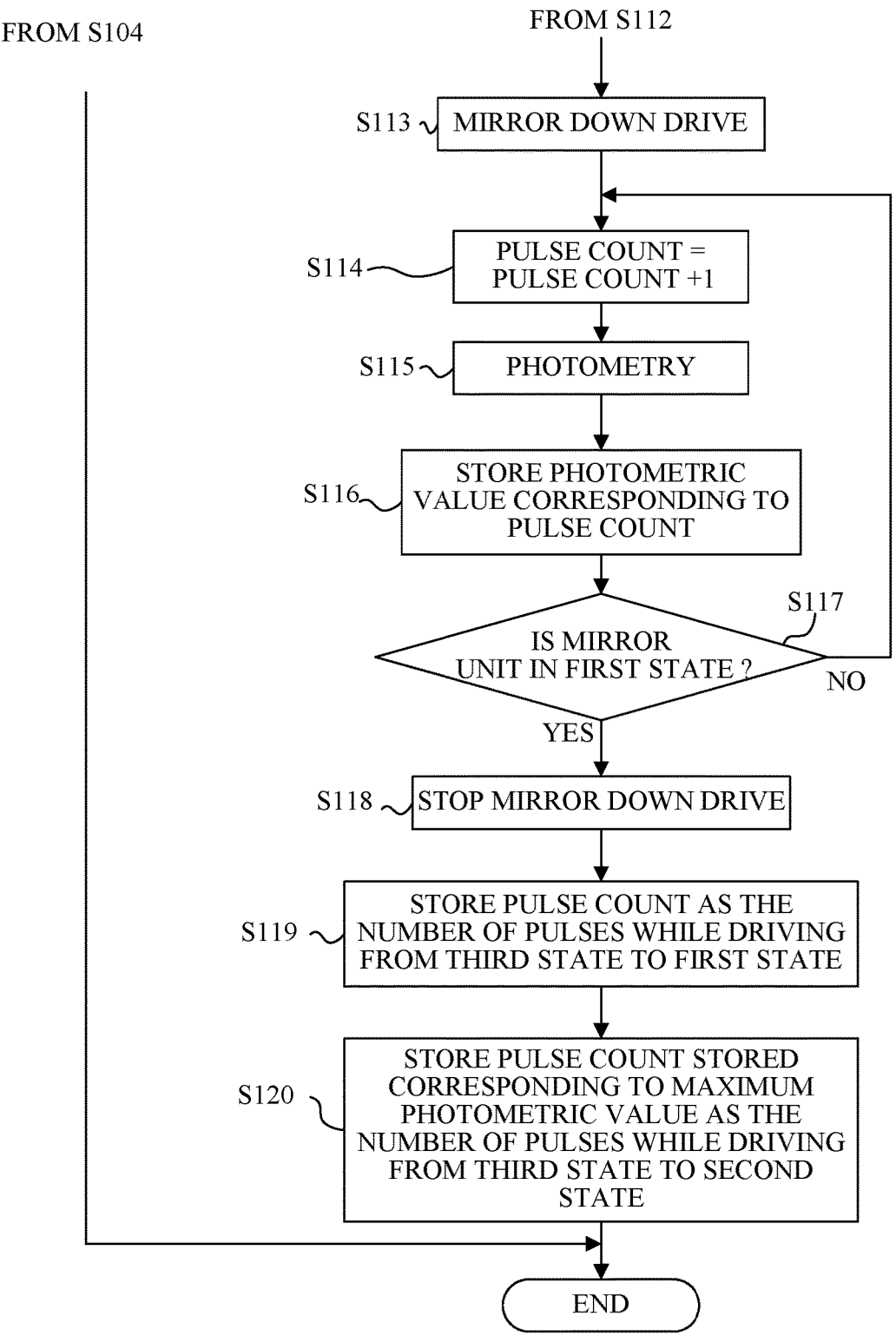

Next, with reference to FIGS. 12A and 12B, an adjustment method of the mirror drive control will be explained. FIGS. 12A and 12B are flowcharts of the adjustment method of the mirror drive control. Adjustment of the mirror drive control is to adjust a reference counter value which is previously stored in the memory 102 and is used to instruct a timing for driving the motor 1. The adjustment of the mirror drive control is performed under a state where a camera is put before a light source with constant brightness. The adjustment of the mirror drive control may be performed at hand of a user after shipping of the camera and may be performed individually at a factory before shipping of the camera.

At step S101, whether or not the mirror unit 500 is in the first state is determined using an output from the position detector 113. If the mirror unit 500 is in the first state, the flow advances to step S102, and otherwise, the flow advances to step S103. At step S102, the mirror unit 500 performs the mirror down drive to become in the first state. At step S103, the photometric sensor 110 starts photometry and the photometric circuit 111 converts an output signal obtained from the photometric sensor 110 into a luminance signal. At step S104, whether or not a luminance signal value which the photometric circuit 111 obtains is larger than a predetermined value is determined. If the luminance signal value is larger than the predetermined value, the flow advances to step S105, and otherwise, as the adjustment of the timing of the mirror drive is unperformable, the flow ends.

At step S105, the CPU 101 initializes the counter value of the FB pulses to 0, and makes the mirror unit 500 perform the mirror up drive. At step S106, the CPU 101 counts up the counter value every time the FB pulse is obtained. At step S107, the photometric sensor 110 starts the photometry, and the photometric circuit 111 converts the output signal obtained from the photometric sensor 110 into the luminance signal. At step S108, memory 102 stores the luminance signal, which the photometric circuit 111 obtains, corresponding to the counter value of the FB pulse. At step S109, whether or not the mirror unit 500 is in the third state is determined using the output from the position detector 113. If the mirror unit 500 is in the third state, the flow advances to step S110, and otherwise, the flow advances to step S106. At step S110, the mirror up drive of the mirror unit 500 is stopped. At step S111, the memory 102 stores the counter value in the case where the mirror unit 500 becomes in the third state as the number of the FB pulses while the mirror unit 500 becomes in the third state from the first state. At step S112, the memory 102 stores the counter value corresponding to the maximum luminance value among the luminance values during the mirror up drive stored at step S108 as the number of pulses while the mirror unit 500 drives from the first state to the second state.

At step S113, the CPU 101 initializes the counter value of the FB pulse to 0, and makes the mirror unit 500 perform the mirror down drive. At step S114, the CPU 101 counts up the counter value every time the FB pulse is obtained. At step S115, the photometric sensor 110 starts the photometry, and the photometric circuit 111 converts the output signal obtained from the photometric sensor 110 into the luminance signal. At step S116, the memory 102 stores the luminance signal, which the photometric circuit 111 obtains, corresponding to the counter value of the FB pulse. At step S117, whether or not the mirror unit 500 is in the first state is determined using the output of the position detector 113. If the mirror unit 500 is in the first state, the flow advances to step S118, and otherwise, the flow returns to step S114. At step S118, the mirror down drive of the mirror unit 500 is stopped. At step S119, the memory 102 stores the counter value in the case where the mirror unit 500 becomes in the first state as the number of pulses required when the mirror unit 500 becomes in the first state from the third state. At step S120, the memory 102 stores the counter pulse of the FB pulse corresponding to the maximum value among the luminance value during the mirror down drive stored at step S116 as the number of pulses while the mirror unit 500 drives from the third state to the second state.

Figure 13:
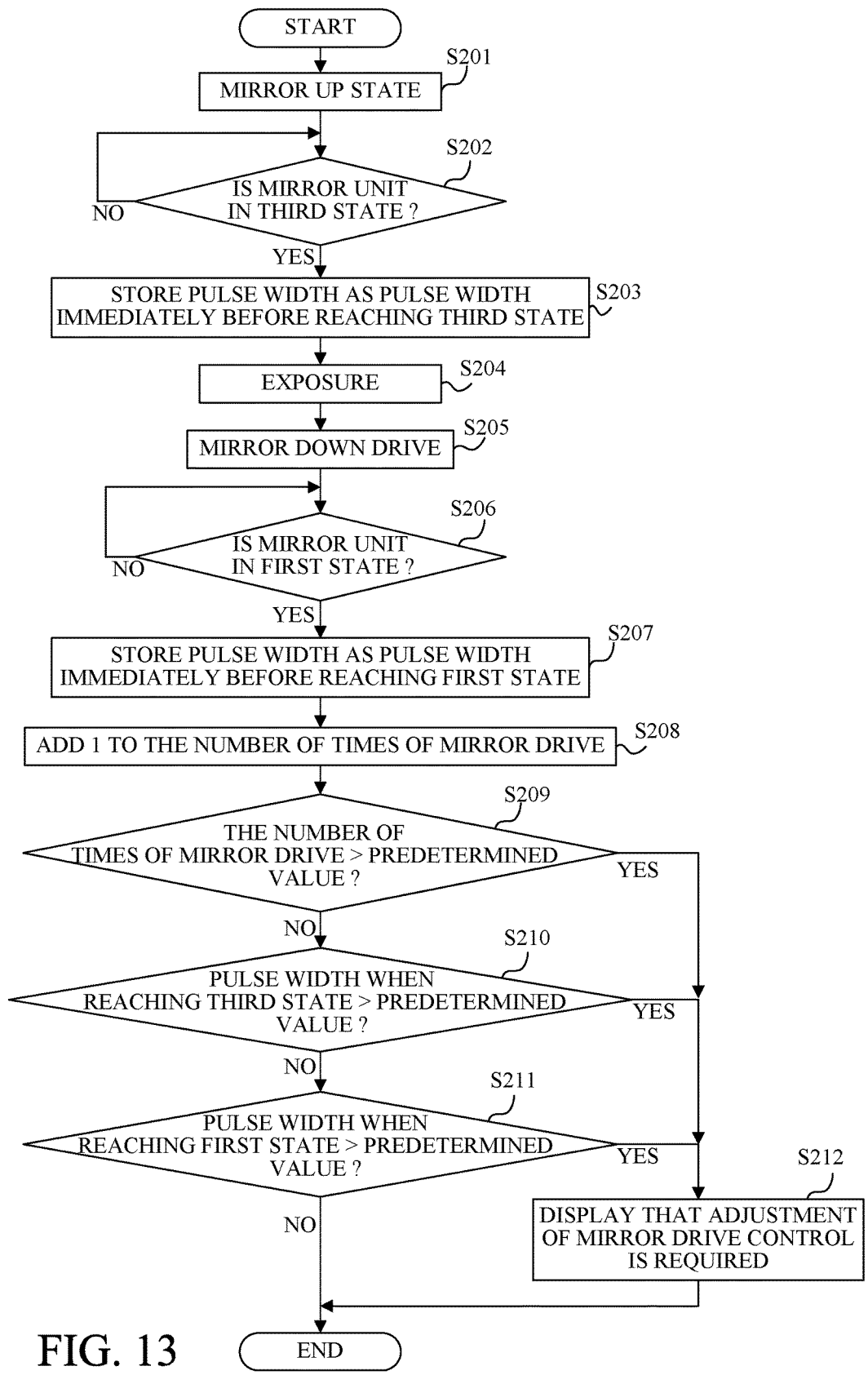
FIG. 13 is a flowchart of a determination method of adjustment of mirror drive control (third example).

Next, with reference to FIG. 13, a determination method of the adjustment of the mirror drive control. FIG. 13 is a flowchart of the determination method of the adjustment of the mirror drive control. Whether or not the adjustment of the mirror drive control is required is determined at each time of a release.

At step S201, the CPU 101 initializes the count value of the FB pulse to 0, and makes the mirror unit 500 perform the mirror up drive. At step S202, whether or not the mirror unit 500 is in the third state is determined using the position detector 113. If the mirror unit 500 is in the third state, the flow advances to step S203, and otherwise, the flow repeats a loop to step S201. At step S203, the memory 102 stores a pulse width of the FB pulse, which the CPU 101 obtains at step S202. At step S204, processing required for an exposure such as a shutter travel and an accumulation.

At step S205, the CPU 101 initializes the counter value of the FB pulse to 0, and makes the mirror unit 500 perform the mirror down drive. At step S206, whether or not the mirror unit 500 is in the first state is determined using the output from the position detector 113. If the mirror unit 500 is in the first state, the flow advances to step S207, and otherwise, the flow repeats a loop to step S206. At step S207, the memory 102 stores the pulse width of the FB pulse which the CPU 101 obtains at step S206.

At step S208, the CPU 101 adds 1 to the number of times of the mirror drive stored by the memory 102. At step S209, whether or not the number of times of the mirror drive is larger than a predetermined value is determined. If the number of times of the mirror drive is larger than the predetermined value, that is, an optimum timing of the mirror drive control may change due to wear of components, the flow advances to step S212. If the number of times of the mirror drive is smaller than the predetermined value, the flow advances to step S210.

At step S210, whether or not the pulse width of FB pulse, which the memory 102 stores at step S203, is smaller than a predetermined value is determined. If the pulse width is smaller than the predetermined value, that is, it is determined that the mirror unit 500 immediately before colliding with the mirror up stopper 505 is not sufficiently decelerated, the flow advances to step S212. If the pulse width is larger than the predetermined value, the flow advances to step S211.

At step S211, whether or not the pulse width immediately before reaching the first state, which the memory 102 stores at step S207, is smaller than a predetermined value is determined. If the pulse width is smaller than the predetermined value, that is, it is determined that the mirror unit 500 immediately before colliding with the mirror down stopper 506 is not sufficiently decelerated, the flow advances to flow step S212. If the pulse width is larger than the predetermined value, the flow ends.

At step S212, the CPU 101 displays an image to encourage a user to adjust the mirror drive control on display unit (not illustrated). The present invention is not limited to this if can encourage a user to adjust the mirror drive control.

The number of times of the mirror drive is also initialized to 0 when the adjustment of the mirror drive control is performed.

Third Example

Figure 14:
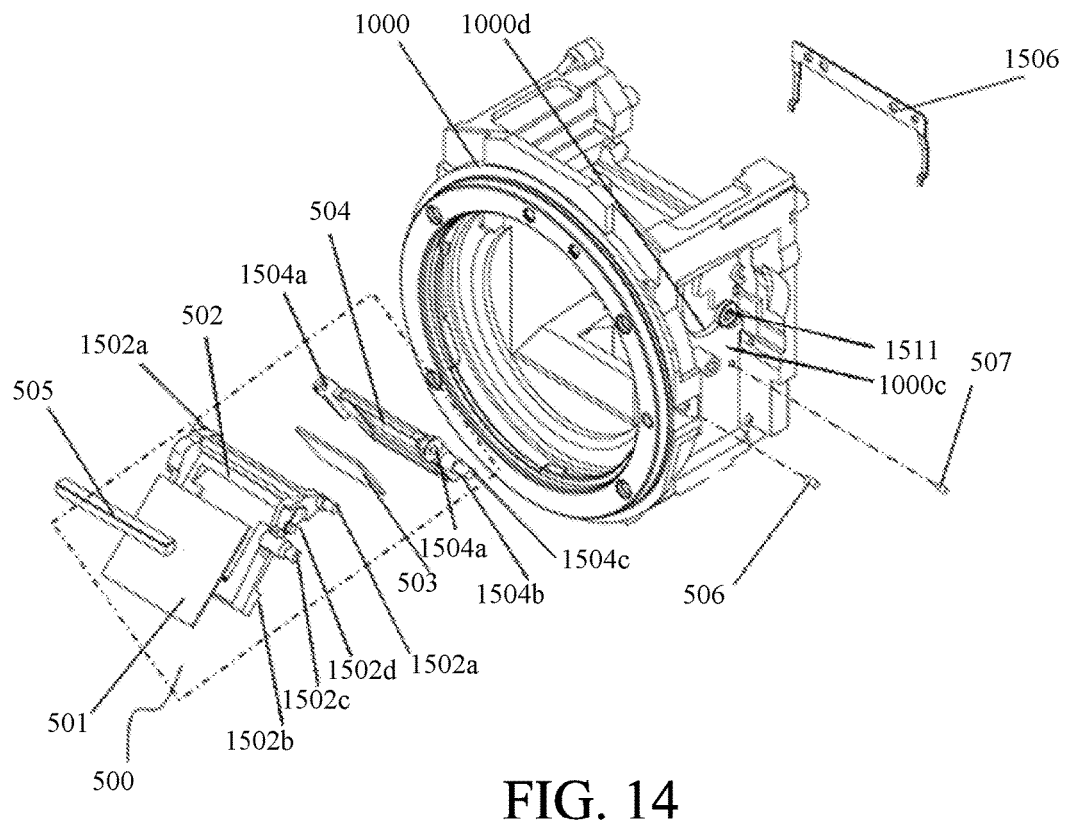
FIG. 14 is an exploded perspective view of a mirror unit and a mirror box (third example).

As mirror drive of this example is the same as that of the second example, detailed explanations are omitted. FIG. 14 is an exploded perspective view of the mirror unit 500 and the mirror box 1000 according to this example. The main mirror holder 502 is attached to the mirror box 1000 by an axis pressure plate 1506 to rotate around a rotational axis 1502*a*. The main holder 502 is provided with an abutting surface 1502*b* that abuts against the mirror down stopper 506 when the mirror unit 500 is in the first state. In this example, the mirror down stopper 506 is formed by an eccentric pin, and thus rotating the mirror down stopper 506 can adjust the mirror down position of the main mirror holder 502. Moreover, the main mirror holder 502 is provided with a sub mirror rotational axis part 1502*d* engaging with a rotation center hole 1504*a* of the sub mirror holder 504.

The sub mirror holder 504 is supported by the main mirror holder 502 to rotate around the sub mirror rotational axis part 1502*d*. The sub mirror holder 504 is provided with an abutting surface 1504*b* that abuts against the sub mirror stopper 507 formed on the mirror box 1000 when the mirror unit 500 is in the first state. In this example, the sub mirror stopper 507 is formed by an eccentric pin, and thus rotating the sub mirror stopper 507 can adjust the mirror down position of the sub mirror holder 504.

When the mirror unit 500 performs the mirror up drive, the main mirror holder 502 is pushed up by the sub mirror holder 504 to rotate. Furthermore, when the mirror unit 500 performs the mirror down drive, the main mirror holder 502 is pulled down by the sub mirror holder 504 to rotate.

Figure 15A:
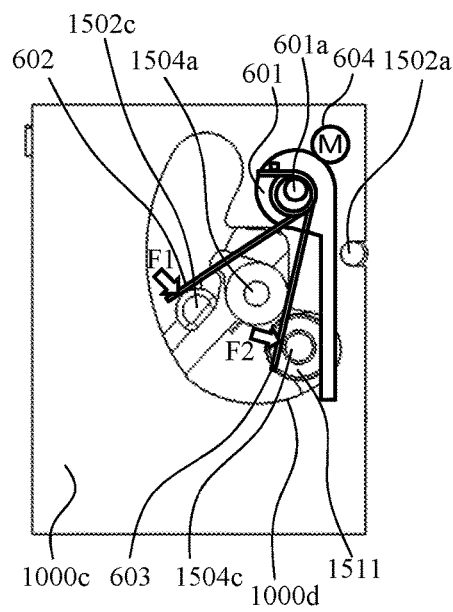
FIGS. 15A and 15B are schematic diagrams illustrating the mirror unit being in a first state (third example).
Figure 15B:
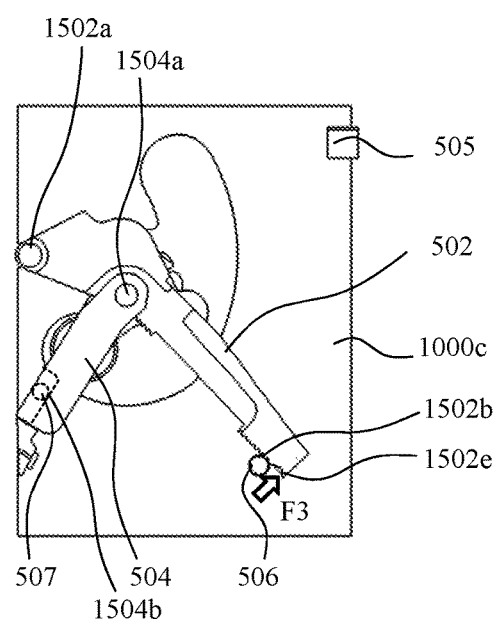

Next, with reference to FIGS. 15A and 15B, FIGS. 16A and 16B, and FIGS. 17A and 17B, an operation of the mirror unit 500 when photographing will be explained. FIGS. 15A and 15B are schematic diagrams illustrating the mirror unit 500 being in the first state.

FIGS. 16A and 16B are schematic diagrams illustrating the mirror unit 500 being in the second state. FIGS. 17A and 17B are schematic diagrams illustrating the mirror unit 500 being in the third state. FIGS. 15A, 16A and 17A are right side views of the mirror unit 500 when viewing from an object side. FIGS. 15B, 16B and 17B are left side views of the mirror unit 500 when viewing from the object side. Unnecessary components for explanations are omitted for simplification.

The mirror box 1000 includes a drive lever 601, a main mirror down spring 602, a sub mirror down spring 603 and a gear 604. The drive force from the motor 1 is transmitted to the gear 604. The drive force from the motor 1 is also transmitted to the drive lever 601 meshed with the gear 604. A first end of the main mirror down spring 602 is hooked on a main mirror down axis 1502*c*. A first end of the sub mirror down spring 603 is hooked on a sub mirror drive axis 1504*c*.

When the drive lever 601 rotates around a rotational axis 601a, the mirror unit 500 shifts into the third state from the first state through the second state. Before photographing, as illustrated in FIGS. 15A and 15B, the main mirror holder 502 and the sub mirror holder 504 abuts against the mirror down stopper 506 and the sub mirror stopper 507, respectively. The main mirror down spring 602 urges the main mirror down axis 1502c formed on the main mirror holder 502 in an arrow F1 direction so that the mirror down stopper 506 stably abuts against the abutting surface 1502b. The sub mirror down spring 603 urges the sub mirror drive axis 1504c formed on the sub mirror holder 504 in an arrow F2 direction so that the sub mirror stopper 507 stably abuts against the abutting surface 1504b. A sleeve 1511 rotatably engages with the sub mirror drive axis 1504c.

When a release signal is input, the drive lever 601 drives the sub mirror drive axis 1504c to rotate the sub mirror holder 504, and the mirror unit 500 becomes in the state of FIGS. 16A and 16B from the state of FIGS. 15A and 15B. Subsequently, the drive lever 601 drives the sub mirror drive axis 1504c in an arrow F4 direction to rotate the main mirror holder 502 and the sub mirror holder 504 initially around the rotational axis 1502a, and the mirror unit 500 becomes in the state of FIGS. 17A and 17B from the state of FIGS. 16A and 16B. In the state of FIGS. 17A and 17B, photographing is performed. The drive lever 601 urges the sub mirror drive axis 1504c (in the arrow F4 direction) to retract above the mirror box 1000 so that the mirror unit 500 does not shield the photographic light flux directed to the image pickup element 103 when photographing. The urging force of the drive lever 601 to the sub mirror drive axis 1504c is received by the mirror up stopper 505 and the rotational axis 1502a.

When photographing ends, the drive lever 601 rotates, and the mirror unit 500 shifts into the state of FIGS. 15A and 15B from the state of FIGS. 17A and 17B through the state of FIGS. 16A and 16B. Then, the drive force from the drive lever 601 becomes drive force in the arrow F2 direction through the sub mirror down spring 603, and is applied to the sub mirror drive axis 1504c. The drive force from the drive lever 601 also becomes drive force in the arrow F1 direction through the main mirror down spring 602, and is applied to the main mirror down axis 1502c.

Figure 18A:
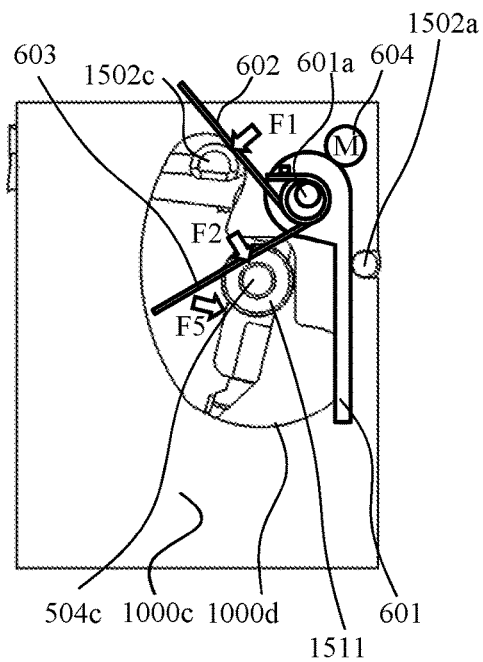
FIGS. 18A and 18B are schematic diagrams illustrating the mirror unit being in a maintenance state (third example).
Figure 18B:
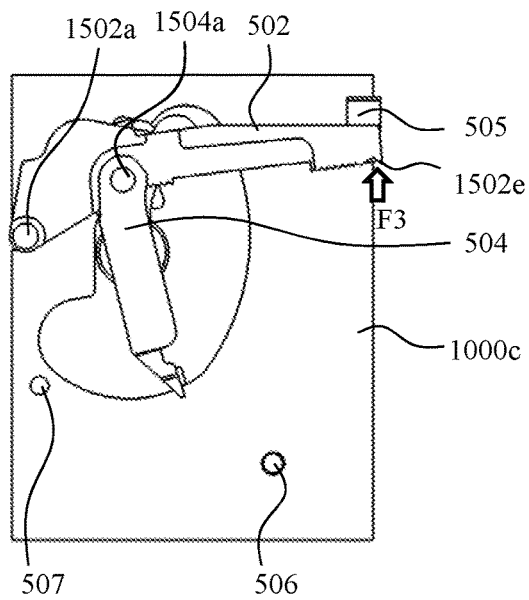

As described above, in a normal photographing operation, the sub mirror 503 is hardly exposed when viewing from the object side. Thus, performing maintenance such as cleaning to the sub mirror 503 is difficult. In this example, to easily perform maintenance to the sub mirror 503, the mirror unit 500 can be in a maintenance state illustrated in FIGS. 18A and 18B.

Next, the maintenance state of the mirror unit 500 will be explained. In the state of FIGS. 15A and 15B, a load in an arrow F3 direction is applied to a main mirror holder tip 1502e from the object side. When the applied load becomes larger than urging force by the main mirror down spring 602 and the sub mirror down spring 603, the main mirror holder 502 starts rotation. Further, the main mirror holder 502 rotate by continuing applying the load to the main mirror holder tip 1502e until abutting against the mirror up stopper 505. Then, the sub mirror holder 504, to which a load is applied through the rotation center hole 1504a, rotates in accordance with the rotation of the main mirror holder 502. Meanwhile, as being urged in the arrow F2 direction by the sub mirror down spring 603, the sub mirror holder 504 continues abutting against a sliding surface (sliding part) 1000d of a mirror box side wall 1000c through the sleeve 1511. Accordingly, when the main mirror holder 502 rotates until abutting against the mirror up stopper 505, the sub mirror holder 504 moves to a position (maintenance position) illustrated in FIGS. 18A and 18B. The state of the mirror unit 500 at this time is the maintenance state illustrated in FIGS. 18A and 18B.

When the sub mirror holder 504 is positioned at the maintenance position, the sub mirror 503 is arranged to face an object direction, that is, to be substantially perpendicular to an image pickup optical path. The main mirror holder 502 is also positioned at the mirror up position. Accordingly, when the mirror unit 500 becomes in the maintenance state, the whole surface of the sub mirror 503 can be seen from the object side, and thus the maintenance to the sub mirror 503 can be performed from the object side easily.

Figure 19:
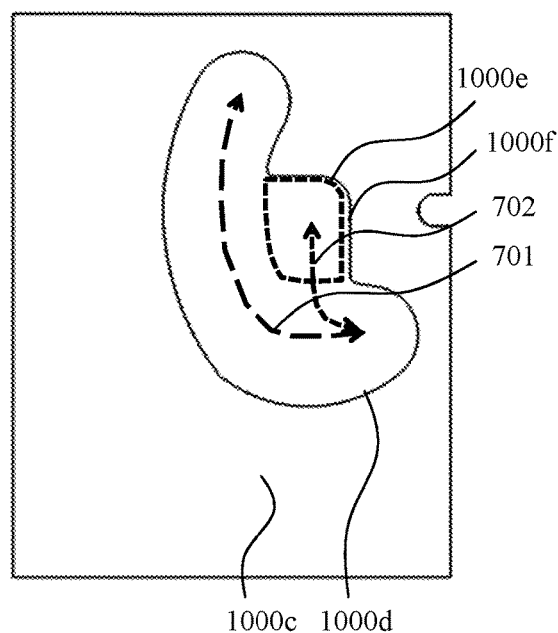
FIG. 19 is a schematic diagram illustrating a relation between a mirror box side wall and a locus of a center of a sub mirror drive axis (third example).

FIG. 19 is a schematic diagram illustrating a relation between the mirror box side wall 1000c and a locus of the center of the sub mirror drive axis 1504c. A first sub mirror drive axis locus 701 is a locus in the case where the mirror unit 500 drives between the first state and the third state when normal photographing. A second sub mirror drive axis locus 702 is a locus in the case where the mirror unit 500 drives between the first state and the maintenance state. In this example, to hold the sub mirror holder 504 at the maintenance position, on the sliding surface 1000d, a sliding surface concave part region 1000e, which is indicated by a dashed line, is formed. Additionally, when the maintenance of the sub mirror 503 positioned at the maintenance position is performed, the load in an arrow F5 direction of FIG. 19 is applied to the sub mirror 503, but is received by a sub mirror holder holding surface 1000f through the sub mirror holder 504 and the sleeve 1511. Accordingly, the position of the sub mirror 503 does not become unstable during the maintenance When the load is not applied to the main mirror holder 502, the main mirror 500 becomes in the state of FIGS. 15A and 15B from the state of FIGS. 18A and 18B. In this example, the load is applied to the main mirror holder tip 502e to rotate the sub mirror 504 to the maintenance position, but the present invention is not limited to this. For example, the sub mirror holder 504 may be rotated by driving the main mirror down axis 1502c using a driving mechanism (not illustrated).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-024475, filed on Feb. 12, 2016, which is hereby incorporated by reference herein in its entirety.

What is claimed is:
1. An image pickup apparatus comprising:
a motor;
a mirror driving unit that drives in accordance with rotation of the motor;
a main mirror holder that rotates between a mirror down position in an image pickup optical path and a mirror up position outside the image pickup optical path in accordance with drive of the mirror driving unit;
a sub mirror holder that is rotatably supported by the main mirror holder and that abuts against the main mirror holder positioned at the mirror up position; and
a driving pin that rotates in accordance with the drive of the mirror driving unit and that rotates the main mirror holder and the sub mirror holder;

wherein the driving pin includes an abutting part that abuts against the mirror driving unit while the mirror driving unit drives, and wherein the abutting part is provided with a reduction structure to reduce a bounce of the sub mirror holder when the main mirror holder reaches the mirror up position, and wherein the reduction structure is located where the driving pin abuts against the mirror driving unit.

2. The image pickup apparatus according to claim 1, wherein the reduction structure is a planer abutting part that abuts against the mirror driving unit when the main mirror holder is positioned at the mirror up position.

3. The image pickup apparatus according to claim 1, wherein the reduction structure an abutting part that abuts against the mirror driving unit when the main mirror holder is positioned at the mirror up position and that has coefficient of friction higher than that of other abutting part.

4. The image pickup apparatus according to claim 1, wherein the driving pin is vided on the sub mirror holder.

5. The image pickup apparatus according to claim 1, further comprising a sun gear that is provided to be substantially concentric with a rotating center of the main mirror holder, wherein the sub mirror holder includes a gear part that meshes with the sun gear.

6. The image pickup apparatus according to claim 5, wherein the gear part meshes with the sun gear outside a mirror box.

7. The image pickup apparatus according to claim 1, further comprising an urging member that urges the driving pin to abut against the mirror driving unit while the mirror driving unit drives.

8. The image pickup apparatus according to claim 1, wherein the motor include a rotor that is rotatable and that has a magnet whose outer peripheral surface divided in a circumferential direction is magnetized in multiple poles with alternating different polarities, and a first detecting element, a second detecting element, a third detecting element and a fourth detecting element, each of which detects a magnetic pole of the magnet, and wherein rotation of the motor is controlled on the basis of signals output from the first and second detecting elements.

9. The image pickup apparatus according to claim 8, wherein when the motor is rotated in a first direction at a first speed, the rotation of the motor is controlled on the basis of the signals output from the first and second detecting elements, wherein when the motor is rotated in the first direction at a second speed lower than the first speed, the rotation of the motor is controlled on the basis of signals output from the third and fourth detecting elements, wherein when the motor is rotated in a second direction opposite to the first direction at a third speed, the motor is controlled on the basis of the signals output from the third and fourth detecting elements, and wherein when the motor is rotated in the second direction at a fourth speed lower than the third speed, the motor is controlled on the basis of the signals output from the first and second detecting elements.

* * * * *